(12) United States Patent
Nam et al.

(10) Patent No.: US 12,744,932 B2
(45) Date of Patent: Sep. 22, 2026

(54) IMAGE ENCODING/DECODING METHOD AND DEVICE FOR ADAPTIVELY CHANGING RESOLUTION, AND METHOD FOR TRANSMITTING BITSTREAM

(71) Applicant: LG ELECTRONICS INC., Seoul (KR)

(72) Inventors: Jung Hak Nam, Seoul (KR); Sunmi Yoo, Seoul (KR); Jaehyun Lim, Seoul (KR); Seung Hwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/698,326

(22) PCT Filed: Oct. 4, 2022

(86) PCT No.: PCT/KR2022/014919
§ 371 (c)(1),
(2) Date: Apr. 3, 2024

(87) PCT Pub. No.: WO2023/059034
PCT Pub. Date: Apr. 13, 2023

(65) Prior Publication Data

US 2024/0406437 A1 Dec. 5, 2024

Related U.S. Application Data

(60) Provisional application No. 63/296,445, filed on Jan. 4, 2022, provisional application No. 63/252,113, filed on Oct. 4, 2021.

(51) Int. Cl.
*H04N 19/59* (2014.01)
*H04N 19/124* (2014.01)
*H04N 19/159* (2014.01)

(52) U.S. Cl.
CPC .......... *H04N 19/59* (2014.11); *H04N 19/124* (2014.11); *H04N 19/159* (2014.11)

(58) Field of Classification Search
CPC ..... H04N 19/59; H04N 19/124; H04N 19/159
(Continued)

(56) References Cited

U.S. PATENT DOCUMENTS 10,645,429 B2 * 5/2020 Soroushian .......... H04N 19/157
2015/0350726 A1 * 12/2015 Tan ...................... H04N 19/136 348/441

(Continued)

FOREIGN PATENT DOCUMENTS

KR 10-2003-0073254 A 9/2003
KR 10-2018-0048713 A 5/2018

(Continued)

OTHER PUBLICATIONS

Andersson et al., “AHG10: GOP-based RPR encoder control”, Joint Video Experts Team (JVET) of ITU-T SG 16 WP 3 and ISO/IEC JTC 1/SC 29, 23rd Meeting, by teleconference, Jul. 7-16, 2021, JVET-W0082.

(Continued)

*Primary Examiner* — Jayanti K Patel
*Assistant Examiner* — Richard B Carter
(74) *Attorney, Agent, or Firm* — Bryan Cave Leighton Paisner LLP

(57) ABSTRACT

An image encoding/decoding method and apparatus are provided. The image decoding method performed by the image decoding apparatus may comprise deriving a reference picture for inter prediction of a current picture, deriving a resolution ratio between the reference picture and the current picture, and modifying a resolution of the reference
(Continued)

picture based on the resolution ratio. The resolution ratio may be derived based on resolution index information of a bitstream.

12 Claims, 12 Drawing Sheets

(58) Field of Classification Search
USPC ...................................... 375/240.21; 348/441
See application file for complete search history.

(56) References Cited

U.S. PATENT DOCUMENTS

| | | | | |
|---|---|---|---|---|
| 2020/0404297 | A1 | 12/2020 | Sarwer et al. | |
| 2021/0044817 | A1 | 2/2021 | Furht et al. | |
| 2021/0084291 | A1 | 3/2021 | Chang et al. | |
| 2021/0092389 | A1 | 3/2021 | Choi et al. | |
| 2021/0112268 | A1* | 4/2021 | Ko | H04N 19/157 |
| 2022/0207650 | A1* | 6/2022 | Kim | G06N 3/084 |
| 2022/0353516 | A1* | 11/2022 | Kim | H04N 19/70 |

FOREIGN PATENT DOCUMENTS

| | | | |
|---|---|---|---|
| KR | 10-2021-0091314 | A | 7/2021 |
| WO | 2020/263009 | A1 | 12/2020 |

OTHER PUBLICATIONS

Chang et al: "Adaptive Resolution Change for Versatile Video Coding", Proceedings of the 2020 IEEE International Conference on Visual Communications and Image Processing (VCIP), Dec. 1-4, 2020, pp. 261-264

Nam et al., "EE1-2.1: RPR encoder with multiple scale factors", Joint Video Experts Team (JVET) of ITU-T SG 16 WP 3 and ISO/IEC JTC 1/SC 29, 25th Meeting, by teleconference, Jan. 12-21, 2022, JVET-Y0068.

Nam et al., "EE1-2.1: RPR encoder with multiple scale factors", Joint Video Experts Team (JVET) of ITU-T SG 16 WP 3 and ISO/IEC JTC 1/SC 29, 26th Meeting, by teleconference, Apr. 20-29, 2022, JVET-Z0065.

Chang et al. "AHG8: Support for reference picture resampling—handling of resampling, TMVP, DMVR, and BDOF," ITU-T SG 16 WP 3 and ISO/IEC JTC 1/SC 29/WG 11, JVET-00134-v2, 4 pages, Jul. 2019.

Chen et al. "CE1-related: Enable PROF for RPR," ITU-T SG 16 WP 3 and ISO/IEC JTC 1/SC 29/WG 11, JVET-P0409-v3, 7 pages, Oct. 2019.

* cited by examiner

IMAGE ENCODING/DECODING METHOD AND DEVICE FOR ADAPTIVELY CHANGING RESOLUTION, AND METHOD FOR TRANSMITTING BITSTREAM

CROSS-REFERENCE TO RELATED APPLICATIONS

This application is a National Stage application under 35 U.S.C. § 371 of International Application No. PCT/KR2022/014919, filed on Oct. 4, 2022, which claims the benefit of and priority to U.S. Provisional Application No. 63/252,113, filed on Oct. 4, 2021 and U.S. Provisional Application No. 63/296,445, filed on Jan. 4, 2022. The disclosures of the prior applications are incorporated by reference in their entirety.

TECHNICAL FIELD

The present disclosure relates to an image encoding/decoding method and apparatus, and, more particularly, to an image encoding/decoding method and apparatus for adaptively modifying a resolution when resolutions of a reference picture and a current picture are different and a method of transmitting a bitstream generated by the image encoding method/apparatus of the present disclosure.

BACKGROUND ART

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

DISCLOSURE

Technical Problem

An object of the present disclosure is to provide an image encoding/decoding method and apparatus with improved encoding/decoding efficiency.

Another object of the present disclosure is to provide an image encoding/decoding method and apparatus for adaptively modifying a resolution.

Another object of the present disclosure is to provide an image encoding/decoding method and apparatus for performing reference picture resampling.

Another object of the present disclosure is to provide an image encoding/decoding method and apparatus for selecting one of various candidate resolutions for one image.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

Technical Solution

According to an embodiment of the present disclosure, an image encoding method performed by an image encoding apparatus may comprise determining a reference picture for inter prediction of a current picture, deriving a resolution ratio between the reference picture and the current picture, and modifying a resolution of the reference picture based on the resolution ratio. Resolution index information indicating the resolution ratio may be encoded into a bitstream.

According to an embodiment of the present disclosure, the resolution index information may indicate one of a plurality of resolution ratios.

According to an embodiment of the present disclosure, the resolution ratio may comprise a first resolution ratio of 2 and a second resolution ratio of $3/2$.

According to an embodiment of the present disclosure, the resolution may be applied in units of group of pictures (GOP).

According to an embodiment of the present disclosure, the resolution ratio may be determined based on an initial quantization parameter of a first picture in the GOP.

According to an embodiment of the present disclosure, the resolution ratio may be derived by downscaling the first picture to a specific resolution.

According to an embodiment of the present disclosure, the initial quantization parameter may be compared with a specific quantization parameter value.

According to an embodiment of the present disclosure, the resolution ratio may be determined based further on a peak signal to noise ratio (PSNR) for a first picture in the GOP.

According to an embodiment of the present disclosure, the PSNR for the first picture may be compared with a specific PSNR value.

According to an embodiment of the present disclosure, the image encoding method may further comprise determining whether reference picture resampling is performed on the current picture.

According to an embodiment of the present disclosure, the reference picture resampling may be performed based on whether to apply BDOF, DMVR, PROF or TMVP.

According to an embodiment of the present disclosure, an image decoding method performed by an image decoding apparatus may comprise deriving a reference picture for inter prediction of a current picture, deriving a resolution ratio between the reference picture and the current picture, and modifying a resolution of the reference picture based on the resolution ratio. The resolution ratio may be derived based on resolution index information of a bitstream.

According to an embodiment of the present disclosure, the resolution ratio may comprise a first resolution ratio of 2 and a second resolution ratio of $3/2$.

According to an embodiment of the present disclosure, the resolution may be applied in units of group of pictures (GOP).

According to an embodiment of the present disclosure, the resolution ratio may be derived based on an initial quantization parameter of a first picture in the GOP.

According to an embodiment of the present disclosure, the resolution ratio may be derived by downscaling the first picture to a specific resolution.

According to an embodiment of the present disclosure, the initial quantization parameter may be compared with a specific quantization parameter value.

According to an embodiment of the present disclosure, the resolution ratio may be determined based further on a peak signal to noise ratio (PSNR) for a first picture in the GOP.

According to an embodiment of the present disclosure, the PSNR for the first picture may be compared with a specific PSNR value.

According to an embodiment of the present disclosure, the image encoding method may further comprise determining whether reference picture resampling is performed on the current picture.

According to an embodiment of the present disclosure, the reference picture resampling may be performed based on whether to apply BDOF, DMVR, PROF or TMVP.

According to an embodiment of the present disclosure, an image encoding apparatus may comprise a memory and at least one processor connected to the memory. The processor may derive a reference picture for inter prediction of a current picture, derive a resolution ratio between the reference picture and the current picture, and modify a resolution of the reference picture based on the resolution ratio. Resolution index information indicating the resolution ratio may be encoded into a bitstream.

According to an embodiment of the present disclosure, an image decoding apparatus may comprise a memory and at least one processor connected to the memory. The processor may derive a reference picture for inter prediction of a current picture, derive a resolution ratio between the reference picture and the current picture, and modify a resolution of the reference picture based on the resolution ratio. The resolution ratio may be derived based on resolution index information of a bitstream.

According to an embodiment of the present disclosure, a bitstream transmission apparatus may comprise at least one processor configured to obtain a bitstream and a transmitter configured to transmit the bitstream. The bitstream is generated by an image encoding method. The image encoding method may comprise determining a reference picture for inter prediction of a current picture, deriving a resolution ratio between the reference picture and the current picture, and modifying a resolution of the reference picture based on the resolution ratio. Resolution index information indicating the resolution ratio may be encoded into a bitstream According to an embodiment of the present disclosure, a bitstream generated by an image encoding apparatus or an image encoding method may be transmitted.

According to an embodiment of the present disclosure, a method of transmitting a bitstream generated by an image encoding method may comprise determining a reference picture for inter prediction of a current picture, deriving a resolution ratio between the reference picture and the current picture, and modifying a resolution of the reference picture based on the resolution ratio. Resolution index information indicating the resolution ratio may be encoded into a bitstream According to an embodiment of the present disclosure, a bitstream generated by an image encoding method may be stored and recorded in a computer-readable medium.

According to an embodiment of the present disclosure, a bitstream generated by an image encoding method may be transmitted by a bitstream transmission apparatus.

The features briefly summarized above with respect to the present disclosure are merely exemplary aspects of the detailed description below of the present disclosure, and do not limit the scope of the present disclosure.

Advantageous Effects

According to the present disclosure, it is possible to provide an image encoding/decoding method and apparatus with improved encoding/decoding efficiency.

According to the present disclosure, it is possible to provide an image encoding/decoding method and apparatus for adaptively modifying a resolution.

According to the present disclosure, it is possible to provide an image encoding/decoding method and apparatus for performing reference picture resampling.

According to the present disclosure, it is possible to provide an image encoding/decoding method and apparatus for determining an optimal resolution.

According to the present disclosure, it is possible to provide an image encoding/decoding method and apparatus for selecting one of various candidate resolutions for one image.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

MODE FOR INVENTION

Figure 1:
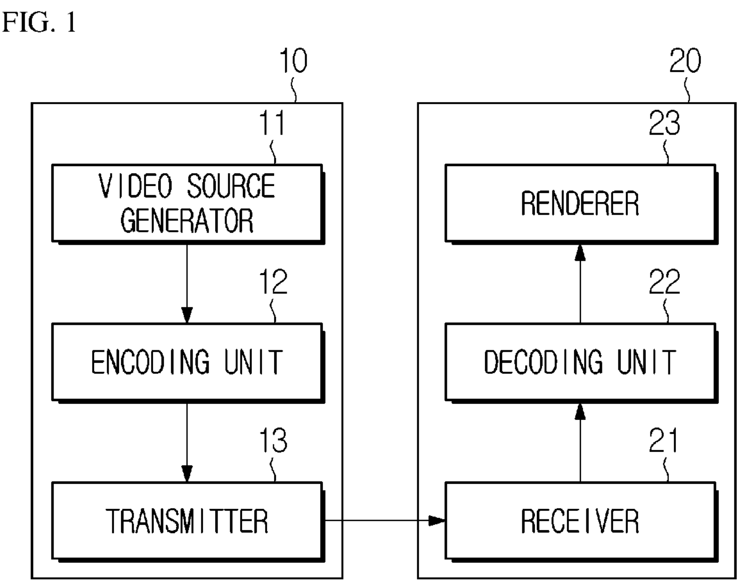
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, if it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, "picture" generally means the basis representing one image in a particular time period, and a slice/tile is an encoding basis constituting a part of a picture. One picture may be composed of one or more slices/tiles. In addition, a slice/tile may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. One unit may include one luma block and two chroma (e.g., Cb, Cr) blocks. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or". For instance, the expression "A/B" and "A, B" may mean "A and/or B." Further, "A/B/C" and "A, B, C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include an encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit(encoder) 12 and a transmitter 13. The decoding apparatus 20 according to an embodiment may include a receiver 21, a decoding unit(decoder) 22 and a renderer 23. The encoding unit 12 may be called a video/image encoding apparatus, and the decoding unit 22 may be called a video/image decoding apparatus. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may obtain the encoded video/image information or data output in the form of a bitstream and forward it to the receiver 21 of the decoding apparatus 20 or another external object through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The transmitter 13 may be provided as a transmission device separate from the encoding apparatus 10, and in this case, the transmission device may include at least one processor that acquires encoded video/image information or data output in the form of a bitstream and a transmission unit for transmitting it in the form of a file or streaming. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
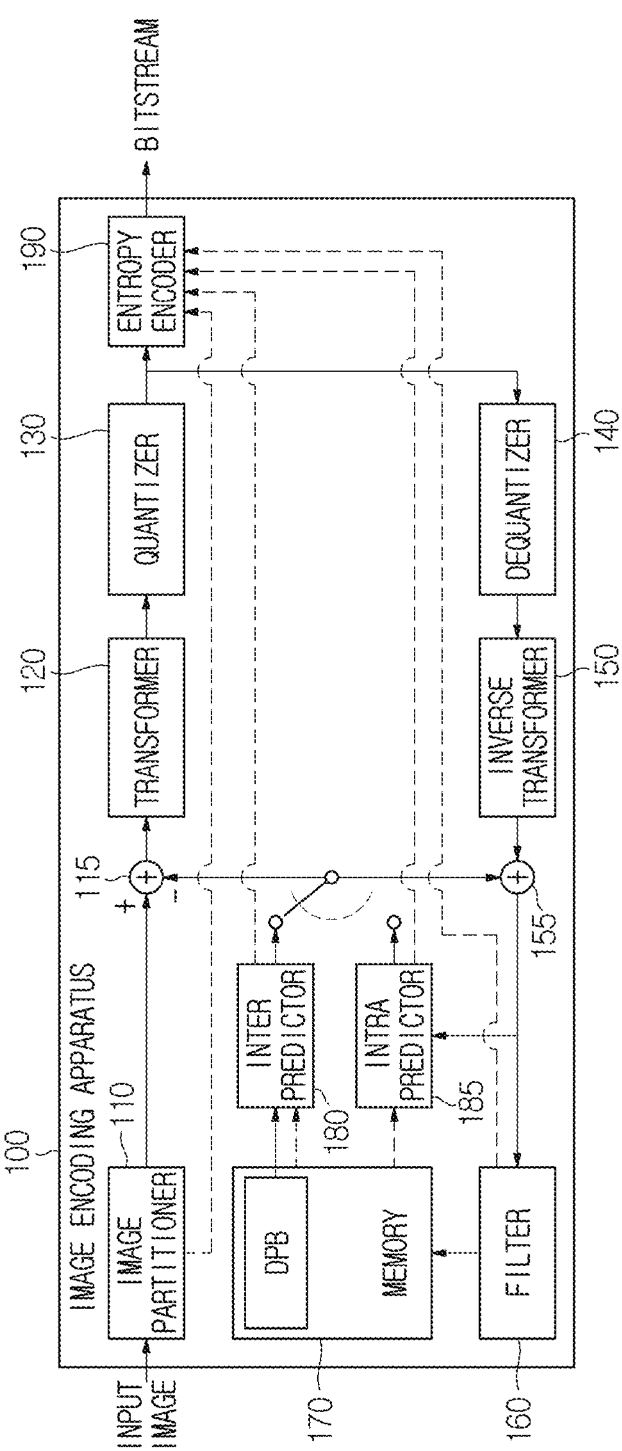
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block. The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit(intra predictor) 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit(inter predictor) 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. IBC basically performs prediction in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block type into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). If there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
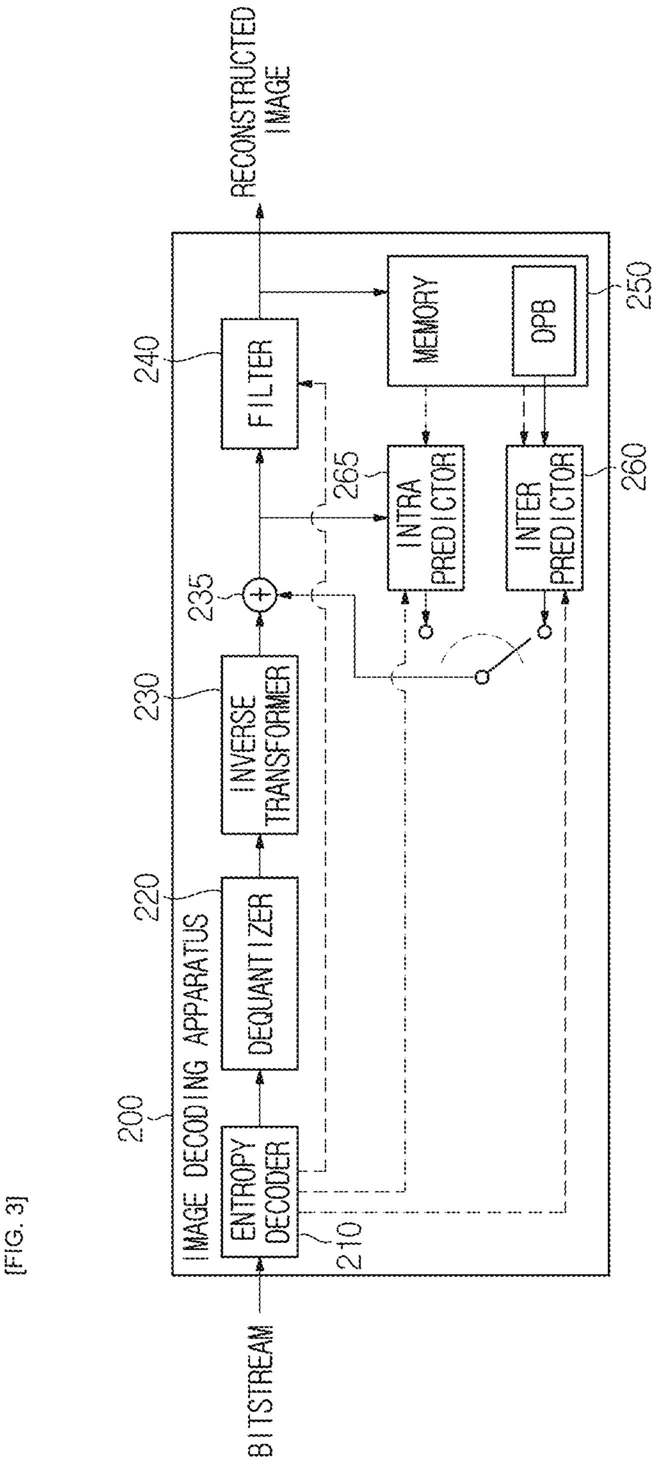
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter predictor 260 and an intra prediction unit 265. The inter predictor(inter prediction unit) 260 and the intra predictor(intra prediction unit) 265 may be collectively referred to as a "prediction unit(predictor)". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 170 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter predictor 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 160 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra predictor 265 may predict the current block by referring to the samples in the current picture. The description of the intra prediction unit 185 is equally applied to the intra prediction unit 265.

The inter predictor 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter predictor 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter predictor 260 and/or the intra prediction unit 265). If there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter predictor 260. The memory 250 may store the motion information of the block from which the motion information in the current picture is derived (or decoded) and/or the motion information of the blocks in the picture that have already been reconstructed. The stored motion information may be transmitted to the inter predictor 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter predictor 260, and the intra predictor 265 of the image decoding apparatus 200.

Overview of Partitioning of CTU

As described above, the coding unit may be acquired by recursively partitioning the coding tree unit (CTU) or the largest coding unit (LCU) according to a quad-tree/binary-tree/ternary-tree (QT/BT/TT) structure. For example, the CTU may be first partitioned into quadtree structures. Thereafter, leaf nodes of the quadtree structure may be further partitioned by a multi-type tree structure.

Partitioning according to quadtree means that a current CU (or CTU) is partitioned into equally four. By partitioning according to quadtree, the current CU may be partitioned into four CUs having the same width and the same height. When the current CU is no longer partitioned into the quadtree structures, the current CU corresponds to the leaf node of the quad-tree structure. The CU corresponding to the leaf node of the quadtree structure may be no longer partitioned and may be used as the above-described final coding unit. Alternatively, the CU corresponding to the leaf node of the quadtree structure may be further partitioned by a multi-type tree structure.

Overview of Inter Prediction

Hereinafter, inter prediction according to the present disclosure will be described.

The following inter prediction may be represented by the decoder side inter prediction-based video/image decoding method described above and the inter prediction unit in the decoding apparatus. Additionally, in the case of the encoder, it may be represented by the inter prediction-based video/image encoding method described above and the inter prediction unit in the encoding apparatus. In addition, the encoded data may be stored in the form of a bitstream.

The prediction unit of the encoding apparatus/decoding apparatus may derive a prediction sample by performing inter prediction on a per-block basis. Inter prediction can be a prediction derived in a manner that is dependent on data elements (e.g., sample values or motion information) of picture(s) other than the current picture. When inter prediction is applied to a current block, a predicted block (a prediction sample array) for the current block may be derived on the basis of a reference block (a reference sample array) specified by a motion vector on a reference picture indicated by a reference picture index. Herein, in order to reduce the amount of motion information transmitted in the inter prediction mode, the motion information of the current block may be predicted on a per block, subblock, or sample basis on the basis of the correlation of motion information between a neighboring block and the current block. The motion information may include a motion vector and a reference picture index. The motion information may further include inter prediction type (L0 prediction, L1 prediction, Bi prediction, etc.) information. When inter prediction is applied, neighboring blocks may include a spatial neighboring block present in the current picture and a temporal neighboring block present in the reference picture. The reference picture including the reference block and the reference picture including the temporal neighboring block may be the same or different. The temporal neighboring block may be called a collocated reference block or a collocated CU (colCU). The reference picture including the temporal neighboring block may be called a collocated picture (colPic). For example, a motion information candidate list may be constructed on the basis of neighboring blocks of the current block. A flag or index information indicating which candidate is selected (used) to derive a motion vector and/or a reference picture index of the current block may be signaled. Inter prediction may be performed on the basis of various prediction modes. For example, in the case of a skip mode and a merge mode, motion information of a current block may be the same as motion information of a selected neighboring block. In the case of the skip mode, unlike the merge mode, the residual signal may not be transmitted. In the case of a motion information prediction (motion vector prediction, MVP) mode, a motion vector of a selected neighboring block may be used as a motion vector predictor, and a motion vector difference may be signaled. In this case, a motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be called an L0 motion vector or MVL0, and a motion vector in the L1 direction may be called an L1 motion vector or MVL1. The prediction based on the L0 motion vector may be called L0 prediction. The prediction based on the L1 motion vector may be called L1 prediction. The prediction based on both the L0 motion vector and the L1 motion vector may be called bi-prediction. Herein, the L0 motion vector may refer to a motion vector associated with a reference picture list L0 (L0), and the L1 motion vector may refer to a motion vector associated with a reference picture list L1 (L1). The reference picture list L0 may include, as reference pictures, pictures preceding the current picture in terms of output order. The reference picture list L1 may include pictures following the current picture in terms of output order. The preceding pictures may be called forward (reference) pictures, and the following pictures may be called backward (reference) pictures. The reference picture list L0 may further include, as reference pictures, pictures following the current picture in terms of output order. In this case, within the reference picture list L0, the preceding pictures may be indexed first, and the following pictures may be indexed next. The reference picture list L1 may further include, as reference pictures, pictures preceding the current picture in terms of output order. In this case, within the reference picture list1, the following pictures may be indexed first, and the preceding pictures may be indexed next. Herein, the output order may correspond to the picture order count (POC) order.

Figure 4:
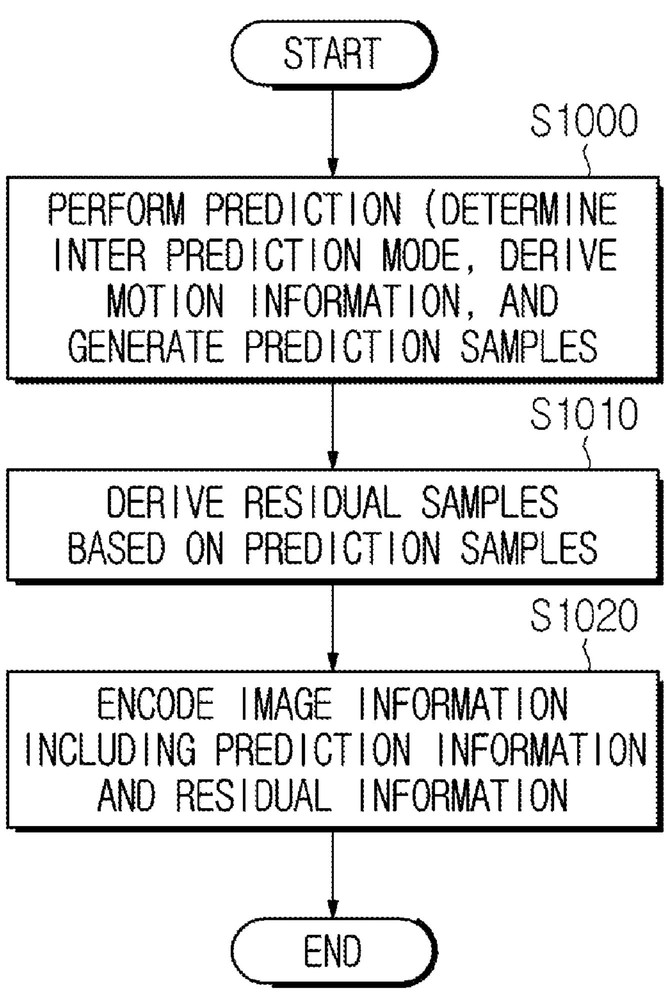
FIGS. 4 to 8 are diagrams illustrating a general inter prediction encoding/decoding procedure.
Figure 5:
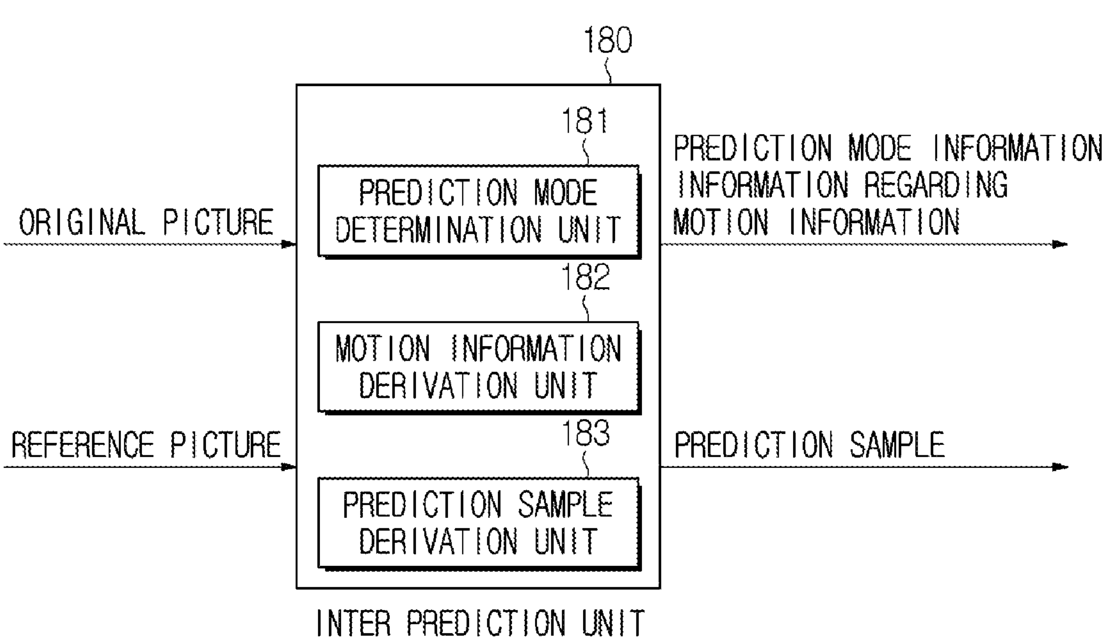
Figure 6:
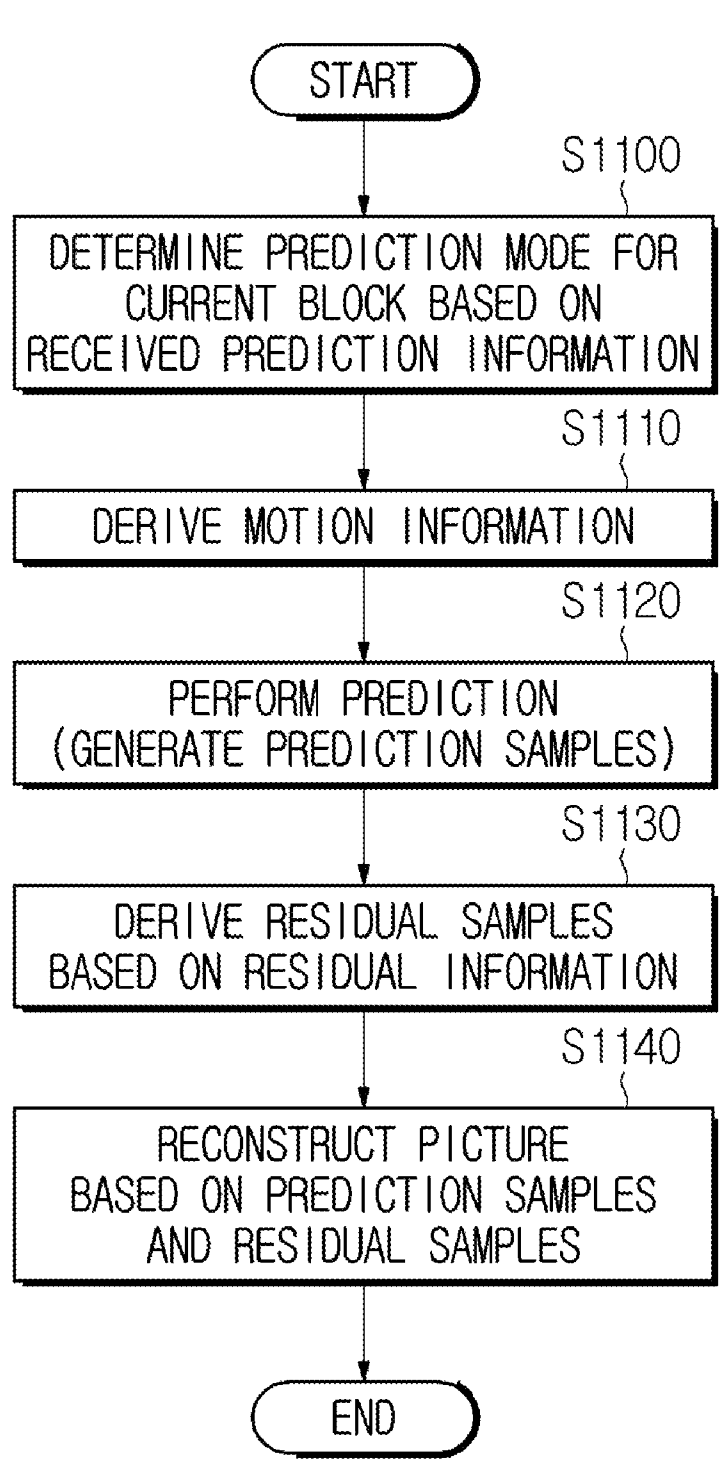

A video/image encoding procedure based on inter prediction and the inter prediction unit in the encoding apparatus are schematically shown in FIGS. 4 to 6, for example.

FIG. 4 is a diagram illustrating an inter prediction-based video/image encoding method, and FIG. 5 is a diagram illustrating an inter prediction unit in an encoding apparatus.

The encoding apparatus may perform inter prediction on a current block (S1000). The encoding apparatus may derive an inter prediction mode and motion information of the current block, and may generate prediction samples of the current block. Herein, the procedures of determination of the inter prediction mode, derivation of the motion information, and generation of the prediction samples may be performed simultaneously, or any one procedure may be performed before the other procedures. For example, the inter prediction unit 180 of the encoding apparatus may include a prediction mode determination unit 181, a motion information derivation unit 182, and a prediction sample derivation unit 183. The prediction mode determination unit 181 may determine the prediction mode for the current block. The motion information derivation unit 182 may derive the motion information of the current block. The prediction sample derivation unit 183 may derive the prediction samples of the current block. For example, the inter prediction unit 180 of the encoding apparatus may search a predetermined area (search area) of reference pictures for a block similar to the current block through motion estimation, and may derive a reference block of which the difference from the current block is a minimum or less than or equal to a predetermined standard. On the basis of this, a reference picture index indicating the reference picture in which the reference block is located may be derived, and a motion vector may be derived on the basis of the location difference between the reference block and the current block. The encoding apparatus may determine a mode applied to the current block among various prediction modes. The encoding apparatus may compare RD costs for the various prediction modes and may determine the optimum prediction mode for the current block.

For example, when the skip mode or the merge mode is applied to the current block, the encoding apparatus may construct a merge candidate list described later, and may derive a reference block of which the difference from the current block is a minimum or less than or equal to a predetermined standard, among reference blocks indicated by merge candidates included in the merge candidate list. In this case, the merge candidate associated with the derived reference block may be selected, and merge index information indicating the selected merge candidate may be generated and signaled to the decoding apparatus. The motion information of the current block may be derived using the motion information of the selected merge candidate.

As another example, when the (A)MVP mode is applied to the current block, the encoding apparatus may construct an (A)MVP candidate list described later, and may use, as a motion vector predictor (mvp) of the current block, a motion vector of an mvp candidate selected among mvp candidates included in the (A)MVP candidate list. In this case, for example, a motion vector indicating a reference block derived by the above-described motion estimation may be used as a motion vector of the current block. Among the mvp candidates, an mvp candidate having the motion vector having the minimum difference from the motion vector of the current block may be the selected mvp candidate. A motion vector difference (MVD) that is a difference resulting from subtracting the mvp from the motion vector of the current block may be derived. In this case, information on the MVD may be signaled to the decoding apparatus. In addition, when the (A)MVP mode is applied, a value of the reference picture index may be constructed as reference picture index information and may be separately signaled to the decoding apparatus.

The encoding apparatus may derive residual samples on the basis of the prediction samples (S1010). The encoding apparatus may compare the prediction samples with the original samples of the current block to derive the residual samples.

The encoding apparatus encodes image information including prediction information and residual information (S1020). The encoding apparatus may output the encoded image information in the form of a bitstream. The prediction information is pieces of information related to the prediction procedure, and may include prediction mode information (e.g., a skip flag, a merge flag, or a mode index) and information on motion information. The information on the motion information may include candidate selection information (e.g., a merge index, an mvp flag, or an mvp index) that is information for deriving a motion vector. In addition, the information on the motion information may include the information on the MVD and/or the reference picture index information described above. In addition, the information on the motion information may include information indicating whether L0 prediction, L1 prediction, or bi-prediction is applied. The residual information is information on the residual samples. The residual information may include information on quantized transform coefficients for the residual samples.

The output bitstream may be stored in a (digital) storage medium and transmitted to the decoding apparatus, or may be transmitted to the decoding apparatus over a network.

In the meantime, as described above, the encoding apparatus may generate a reconstructed picture (including reconstructed samples and a reconstructed block) on the basis of the reference samples and the residual samples. This is to derive the same prediction result by the encoding apparatus as that performed in the decoding apparatus, and through this, coding efficiency may be increased. Accordingly, the encoding apparatus may store a reconstructed picture (or reconstructed samples, a reconstructed block) in a memory, and may use the same as a reference picture for inter prediction. As described above, an in-loop filtering procedure may be further applied to the reconstructed picture.

Figure 7:
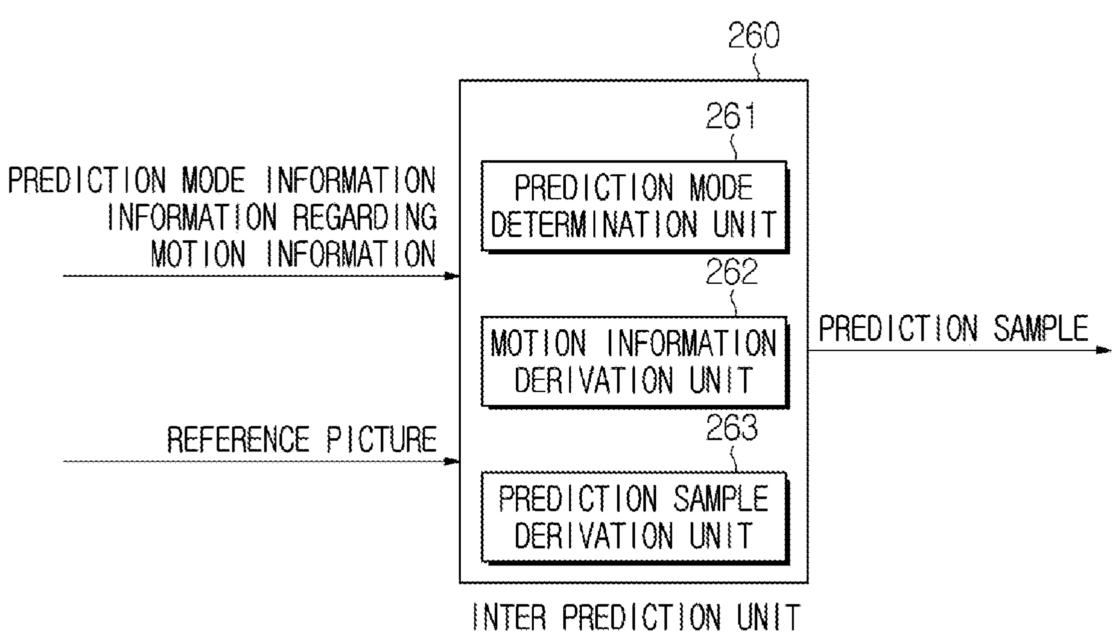
Figure 8:
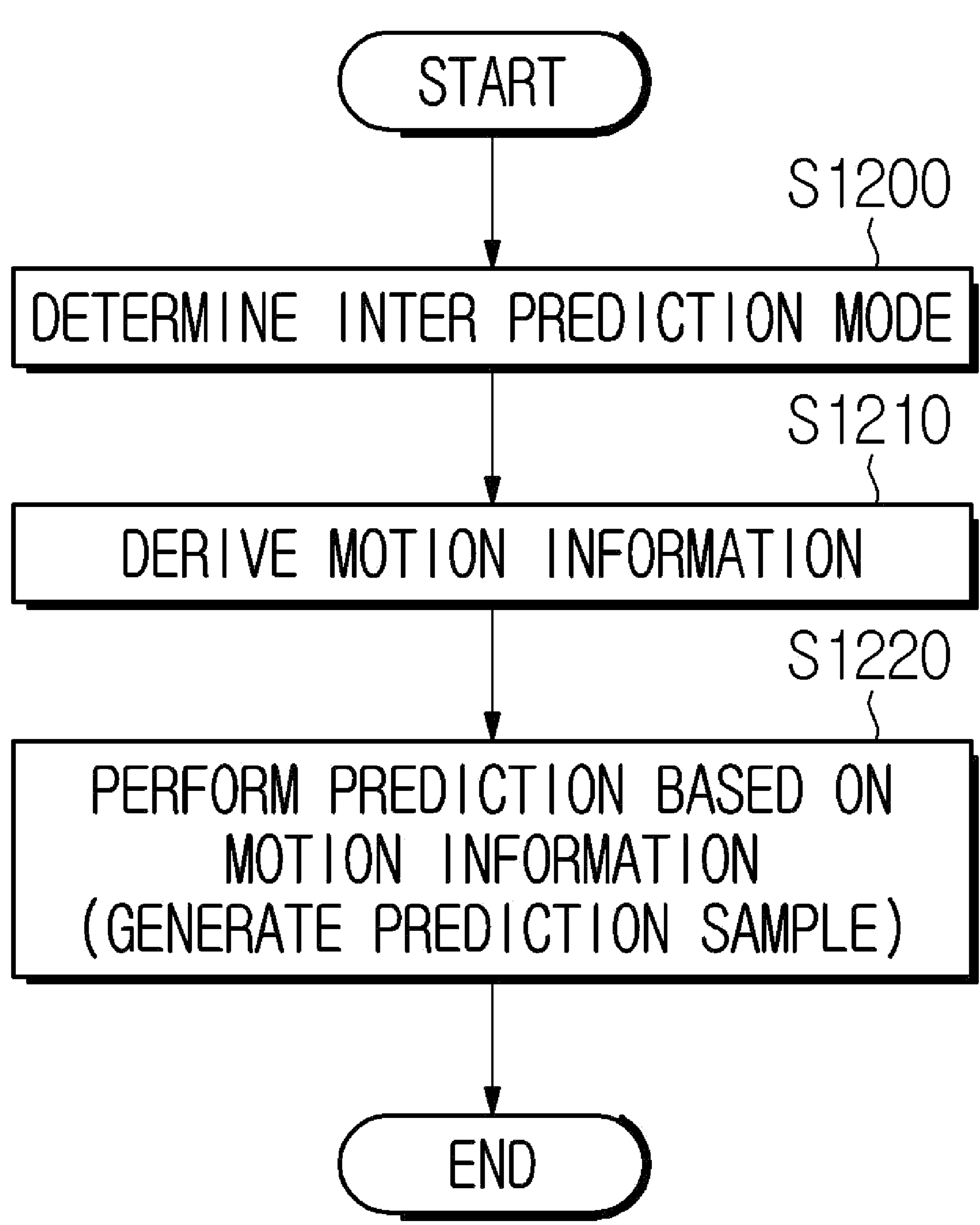

A video/image decoding procedure based on inter prediction and the inter prediction unit in the decoding apparatus are schematically shown in FIGS. 7 to 8, for example.

FIG. 7 is a diagram illustrating an inter prediction-based video/image decoding method, and FIG. 8 is a diagram illustrating an inter prediction unit in a decoding apparatus.

The decoding apparatus may perform the operation corresponding to the operation performed by the encoding apparatus. The decoding apparatus may perform prediction on the current block on the basis of the received prediction information and may derive prediction samples.

Specifically, the decoding apparatus may determine a prediction mode for the current block on the basis of the received prediction information (S1100). The decoding apparatus may determine which inter prediction mode is applied to the current block on the basis of the prediction mode information in the prediction information.

For example, on the basis of the merge flag, it may be determined whether the merge mode is applied to the current block or the (A)MVP mode is determined. Alternatively, one of various inter prediction mode candidates may be selected on the basis of the mode index. The inter prediction mode candidates may include a skip mode, a merge mode, and/or an (A)MVP mode, or may include various inter prediction modes described later.

The decoding apparatus may derive motion information of the current block on the basis of the determined inter prediction mode (S1110). For example, when the skip mode or the merge mode is applied to the current block, the decoding apparatus may construct a merge candidate list described later, and may select one merge candidate among merge candidates included in the merge candidate list. The selection may be performed on the basis of the above-described selection information (a merge index). The motion information of the current block may be derived using the motion information of the selected merge candidate. The motion information of the selected merge candidate may be used as the motion information of the current block.

As another example, when the (A)MVP mode is applied to the current block, the decoding apparatus may construct an (A)MVP candidate list described later, and may use, as a motion vector predictor (mvp) of the current block, a motion vector of an mvp candidate selected among mvp candidates included in the (A)MVP candidate list. The selection may be performed on the basis of the above-described selection information (an mvp flag or an mvp index). In this case, the MVD of the current block may be derived on the basis of the information on the MVD, and the motion vector of the current block may be derived on the basis of the mvp of the current block and the MVD. In addition, a reference picture index of the current block may be derived on the basis of the reference picture index information. A picture indicated by the reference picture index in the reference picture list related to the current block may be derived as a reference picture that is referenced for inter prediction of the current block.

In the meantime, as will be described later, the motion information of the current block may be derived without constructing a candidate list. In this case, the motion information of the current block may be derived according to a procedure described in a prediction mode described later. In this case, the candidate list configuration as described above may be omitted.

The decoding apparatus may generate prediction samples for the current block on the basis of the motion information of the current block (S1120). In this case, the reference picture may be derived on the basis of the reference picture index of the current block, and the prediction samples of the current block may be derived using samples of a reference block indicated on the reference picture by the motion vector of the current block. In this case, as described later, in some cases, a prediction sample filtering procedure may be further performed on all or some of the prediction samples of the current block.

For example, the inter prediction unit 260 of the decoding apparatus may include a prediction mode determination unit 261, a motion information derivation unit 262, and a prediction sample derivation unit 263. The prediction mode determination unit 181 may determine the prediction mode for the current block on the basis of received prediction mode information. The motion information derivation unit 182 may derive the motion information (a motion vector and/or a reference picture index) of the current block on the basis of received information on the motion information. The prediction sample derivation unit 183 may derive the prediction samples of the current block.

The decoding apparatus may generate residual samples for the current block on the basis of the received residual information (S1130). The decoding apparatus may generate reconstructed samples for the current block on the basis of the prediction samples and the residual samples, and may generate, on the basis of this, a reconstructed picture (S1140). Afterward, as described above, an in-loop filtering procedure may be further applied to the reconstructed picture.

As described above, the inter prediction procedure may include the steps of determining an inter prediction mode, deriving motion information according to the determined prediction mode, and performing prediction based on the derived motion information (generating a prediction sample). The inter prediction procedure may be performed in the encoding apparatus and the decoding apparatus as described above.

FIG. 8 is a diagram illustrating an inter prediction procedure.

Various inter prediction modes may be used for prediction of the current block in the picture. For example, various modes, such as a merge mode, a skip mode, a motion vector prediction (MVP) mode, an affine mode, a subblock merge mode, and a merge with MVD (MMVD) mode, and the like may be used. A decoder side motion vector refinement (DMVR) mode, an adaptive motion vector resolution (AMVR) mode, a bi-prediction with CU-level weight (BCW), a bi-directional optical flow (BDOF), and the like may also be used as additional modes additionally or instead. The affine mode may be called an affine motion prediction mode. The MVP mode may be referred to as advanced motion vector prediction (AMVP) mode. In this document, some modes and/or motion information candidates derived by some modes may be included as one of motion information candidates of other modes. For example, an HMVP candidate may be added as a merge candidate in the merge/skip mode or may be added as an mvp candidate in the MVP mode.

Prediction mode information indicating the inter prediction mode of the current block may be signaled from the encoding apparatus to the decoding apparatus. The prediction mode information may be included in the bitstream and received by the decoding apparatus. The prediction mode information may include index information indicating one of a plurality of candidate modes. Alternatively, the inter prediction mode may be indicated through hierarchical signaling of flag information. In this case, the prediction mode information may include one or more flags. For example, a skip flag may be signaled to indicate whether a skip mode is applied, and if the skip mode is not applied, a merge flag may be signaled to indicate whether a merge mode is applied, and if the merge mode is not applied, it is indicated to apply an MVP mode or a flag for additional classification may be further signaled. The affine mode may be signaled in an independent mode or may be signaled in a mode dependent on the merge mode or the MVP mode. For example, the affine mode may include an affine merge mode and an affine MVP mode.

Meanwhile, information indicating whether the list0 (L0) prediction, the list1 (L1) prediction, or the bi-prediction described above is used in the current block (current coding unit) may be signaled in the current block. The information may be referred to as motion prediction direction information, inter prediction direction information or inter prediction indication information, and may be configured/encoded/signaled in the form of, for example, an inter_pred_idc syntax element. That is, the inter_pred_idc syntax element may indicate whether the aforementioned list0 (L0) prediction, list1 (L1) prediction, or bi-prediction is used for the current block (current coding unit). In this document, for the convenience of description, the inter prediction type (L0 prediction, L1 prediction, or BI prediction) indicated by the inter_pred_idc syntax element may be indicated as a motion prediction direction. L0 prediction may be represented as pred_L0, L1 prediction as pred_L1, and bi-prediction as pred_BI. For example, the following prediction types may be indicated depending on the value of the inter_pred_idc syntax element.

TABLE 1

| | Name of inter_pred_idc | |
|---|---|---|
| inter_pred_idc | (cbWidth + chHeight) != 8 | (chWidth + cbHeight) == 8 |
| 0 | PRED_L0 | PRED_L0 |
| 1 | PRED_L1 | PRED_L1 |
| 2 | PRED_B1 | n.s. |

As described above, one picture may include one or more slices. The slice may have one of slice types including intra (I) slice, predictive (P) slice, and bi-predictive (B) slice. The slice type may be indicated based on slice type information. For blocks in an I slice, inter prediction may not be used for prediction and only intra prediction may be used. Of course, even in this case, the original sample value may be coded and signaled without prediction. Intra prediction or inter prediction may be used for blocks in a P slice, and only uni prediction may be used when inter prediction is used. Meanwhile, intra prediction or inter prediction may be used for blocks in a B slice, and up to bi prediction may be used when inter prediction is used.

L0 and L1 may include reference pictures that are previously encoded/decoded prior to the current picture. For example, L0 may include reference pictures before and/or after the current picture in POC order, and L1 may include reference pictures after and/or before the current picture in POC order. In this case, L0 may be assigned a lower reference picture index relative to previous reference pictures in the POC order than the current reference pictures, and L1 may be assigned a lower reference picture index relative to previous reference pictures in the POC order than the current picture. In the case of B slice, bi-prediction may be applied, and in this case, unidirectional bi-prediction may be applied or bidirectional bi-prediction may be applied. The bidirectional bi-prediction may be called true bi-prediction.

Specifically, for example, the information on the inter prediction mode of the current block may be coded at a level such as CU (CU syntax) and signaled or implicitly determined according to a condition. In this case, the information may be explicitly signaled in some modes and may be implicitly derived in other modes.

For example, the CU syntax may carry information regarding the (inter) prediction mode as follows.

TABLE 2

| | Descriptor |
|---|---|
| coding_unit( x0, y0, cbWidth, cbHeight, treeType ) { | |
| if( slice_type != I \|\| sps_ibc_enabled_flag ) { | |
| if( treeType != DUAL_TREE_CHROMA && !( cbWidth = = 4 && cbHeight = = 4 && !sps_ibc_enabled_flag ) ) | |
| cu_skip_flag[ x0 ][ y0 ] | ae(v) |
| if( cu_skip_flag[ x0 ][ y0 ] = = 0 && slice_type != I && !( cbWidth = = 4 && cbHeight = = 4 ) ) | |
| pred_mode_flag | ae(v) |
| if( ( ( slice_type == I && cu_skip_flag[ x0 ][ y0 ] = = 0 ) \|\| ( slice_type != I && ( CuPredMode[ x0 ][ y0 ] != MODE_INTRA \|\| ( cbWidth = = 4 && cbHeight = = 4 && cu_skip_flag[ x0 ][ y0 ] = = 0 ) ) ) ) && sps_ibc_enabled_flag && ( cbWidth != 128 cbHeight != 128 ) ) | |
| pred_mode_ibc_flag | ae(v) |
| } | |
| if( CuPredMode[ x0 ][ y0 ] = = MODE_INTRA ) { | |
| if( sps_pcm_enabled_flag && cbWidth >= MinIpcmCbSizeY && cbWidth <= MaxIpcmCbSizeY && cbHeight >= MinIpcmCbSizeY && cbHeight <= MaxIpcmCbSizeY ) | |
| pcm_flag[ x0 ][ y0 ] | ae(v) |
| if( pcm_flag[ x0 ][ y0 ] ) { | |
| while( !byte_aligned( ) ) | |
| pcm_alignment_zero_bit | f(1) |
| pcm_sample( cbWidth, cbHeight, treeType) | |
| } else { | |
| if( treeType = = SINGLE_TREE \|\| treeType = = DUAL_TREE_LUMA ) { | |
| if( cbWidth <= 32 && cbHeight <= 32 ) | |
| intra_bdpcm_flag[ x0 ][ y0 ] | ae(v) |
| if( intra_bdpcm_flag[ x0 ][ y0 ] ) | |
| intra_bdpcm_dir_flag[ x0 ][ y0 ] | ae(v) |
| else { | |
| if( sps_mip_enabled_flag && ( Abs( Log2( cbWidth ) − Log2( cbHeight ) ) <= 2 ) && cbWidth <= MaxTbSizeY && cbHeight <= MaxTbSizeY ) | |
| intra_mip_flag[ x0 ][ y0 ] | ae(v) |
| if( intra_mip_flag[ x0 ][ y0 ] ) { | |
| intra_mip_mpm_flag[ x0 ][ y0 ] | ae(v) |
| if( intra_mip_mpm_flag[ x0 ][ y0 ] ) | |
| intra_mip_mpm_idx[ x0 ][ y0 ] | ae(v) |
| else | |
| intra_mip_mpm_remainder[ x0 ][ y0 ] | ae(v) |
| } else { | |
| if( sps_mrl_enabled_flag && ( ( y0 % CtbSizeY ) > 0 ) ) | |
| intra_luma_ref_idx[ x0 ][ y0 ] | ae(v) |
| if ( sps_isp_enabled_flag && intra_luma_ref_idx[ x0 ][ y0 ] = = 0 && ( cbWidth <= MaxTbSizeY && cbHeight <= MaxTbSizeY ) && ( cbWidth * cbHeight > MinTbSizeY * MinTbSizeY ) ) | |
| intra_subpartitions_mode_flag[ x0 ][ y0 ] | ae(v) |
| if( intra_subpartitions_mode_flag[ x0 ][ y0 ] = = 1 && cbWidth <= MaxTbSizeY && cbHeight <= MaxTbSizeY ) | |
| intra_subpartitions_split_flag[ x0 ][ y0 ] | ae(v) |
| if( intra_luma_ref_idx[ x0 ][ y0 ] = = 0 && intra_subpartitions_mode_flag[ x0 ][ y0 ] = = 0 ) | |
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |

TABLE 2-continued

| | Descriptor |
|---|---|
| if( treeType = = SINGLE_TREE \|\| treeType = = DUAL_TREE_CHROMA ) | |
| intra_chroma_pred_mode[ x0 ][ y0 ] | ae(v) |
| } | |
| } else if( treeType != DUAL_TREE_CHROMA ) { /* MODE_INTER or MODE_IBC */ | |
| if( cu_skip_flag[ x0 ][ y0 ] = = 0 ) | |
| general_merge_flag[ x0 ][ y0 ] | ae(v) |
| if( general_merge_flag[ x0 ][ y0 ] ) { | |
| merge_data( x0, y0, cbWidth, cbHeight ) | |
| } else if ( CuPredMode[ x0 ][ y0 ] = = MODE_IBC ) { | |
| mvd_coding( x0, y0, 0, 0 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) { | |
| amvr_precision_flag[ x0 ][ y0 ] | ae(v) |
| } | |
| } else { | |
| if( slice_type = = B ) | |
| inter_pred_idc[ x0 ][ y0 ] | ae(v) |
| if( sps_affine_enabled_flag && cbWidth >= 16 && cbHeight >= 16 ) { | |
| inter_affine_flag[ x0 ][ y0 ] | ae(v) |
| if( sps_affine_type_flag && inter_affine_flag[ x0 ][ y0 ] ) | |
| cu_affine_type_flag[ x0 ][ y0 ] | ae(v) |
| } | |
| if( sps_smvd_enabled_flag && inter_pred_idc[ x0 ][ y0 ] = = PRED_BI && | |
| !inter_affine_flag[ x0 ][ y0 ] && RefIdxSymL0 > −1 && RefIdxSymL1 > −1 ) | |
| sym_mvd_flag[ x0 ][ y0 ] | ae(v) |
| if( inter_pred_idc[ x0 ][ y0 ] != PRED_L1 ) { | |
| if( NumRefIdxActive[ 0 ] > 1 && !sym_mvd_flag[ x0 ][ y0 ] ) | |
| ref_idx_10[ x0 ][ y0 ] | ae(v) |
| mvd_coding( x0, y0, 0, 0) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ 0 ] != PRED_L0 ) { | |
| if( NumRefIdx Active[ 1 ] > 1 && !sym_mvd_flag[ x0 ][ y0 ] ) | |
| ref_idx_11[ x0 ][ y0 ] | ae(v) |
| if( mvd_11_zero_flag && inter_pred_idc[ x0 ][ y0 ] = = PRED_BI ) { | |
| MvdL1[ x0 ][ y0 ][ 0 ] = 0 | |
| MvdL1[ x0 ][ y0 ][ 1 ] = 0 | |
| MvdCpL1[ x0 ][ y0 ][ 0 ][ 0 ] = 0 | |
| MvdCpL1[ x0 ][ y0 ][ 0 ][ 1 ] = 0 | |
| MvdCpL1[ x0 ][ y0 ][ 1 ][ 0 ] = 0 | |
| MvdCpL1[ x0 ][ y0 ][ 1 ][ 1 ] = 0 | |
| MvdCpL1[ x0 ][ y0 ][ 2 ][ 0 ] = 0 | |
| MvdCpL1[ x0 ][ y0 ][ 2 ][ 1 ] = 0 | |
| } else { | |
| if( sym_mvd_flag[ x0 ][ y0 ] ) { | |
| MvdL1[ x0 ][ y0 ][ 0 ] = −MvdL0[ x0 ][ y0 ][ 0 ] | |
| MvdL1[ x0 ][ y0 ][ 1 ] = −MvdL0[ x0 ][ y0 ][ 1 ] | |
| } else | |
| mvd_coding( x0, y0, 1, 0 ) | |
| if( MotionModelIdc[ x0 ][ y0 ] > 0 ) | |
| mvd_coding( x0, y0, 1, 1 ) | |
| if(MotionModelIdc[ x0 ][ y0 ] > 1 ) | |
| mvd_coding( x0, y0, 1, 2 ) | |
| mvp_l1_flag[ x0 ][ y0 ] | ae(v) |
| } | |
| } else { | |
| MvdL1[ x0 ][ y0 ][ 0 ] = 0 | |
| MvdL1[ x0 ][ y0 ][ 1 ] = 0 | |
| } | |

TABLE 2-continued

```
                                                                    Descriptor
      if( ( sps_amvr_enabled_flag && inter_affine_flag[ x0 ][ y0 ] = =
0 &&
          ( MvdL0[ x0 ][ y0 ][ 0 ] != 0 MvdL0[ x0 ][ y0 ][ 1 ] != 0
||
            MvdL1[ x0 ][ y0 ][ 0 ] != 0 || MvdL1[ x0 ][ y0 ][ 1 ] !=
0 ) ) ||
        ( sps_affine_amvr_enabled_flag &&
inter_affine_flag[ x0 ][ y0 ] = = 1 &&
          ( MvdCpL0[ x0 ][ y0 ][ 0 ] [ 0 ] != 0 ||
MvdCpL0[ x0 ][ y0 ][ 0 ] [ 1 ] != 0 ||
          MvdCpL1[ x0 ][ y0 ][ 0 ] [0 ] != 0 ||
MvdCpL1[ x0 ][ y0 ][ 0 ] [ 1 ] != 0 ||
          MvdCpL0[ x0 ][ y0 ][ 1 ] [ 0 ] != 0 ||
MvdCpL0[ x0 ][ y0 ][ 1 ] [ 1 ] != 0 ||
          MvdCpL1[ x0 ][ y0 ][ 1 ] [ 0 ] != 0 ||
MvdCpL1[ x0 ][ y0 ][ 1 ] [ 1 ] != 0 ||
          MvdCpL0[ x0 ][ y0 ][ 2 ] [ 0 ] != 0 ||
MvdCpL0[ x0 ][ y0 ][ 2 ] [ 1 ] != 0 ||
          MvdCpL1[ x0 ][ y0 ][ 2 ] [ 0 ] != 0 ||
MvdCpL1[ x0 ][ y0 ][ 2 ] [ 1 ] != 0 ) ) {
        amvr_flag[ x0 ][ y0 ]                                       ae(v)
        if( amvr_flag[ x0 ][ y0 ] )
          amvr_precision_flag[ x0 ][ y0 ]                           ae(v)
      }
        if( sps_bcw_enabled_flag && inter_pred_idc[ x0 ][ y0 ] = =
PRED_BI &&
          luma_weight_10_flag[ ref_idx_10 [ x0 ][ y0 ] ] = = 0 &&
          luma_weight_11_flag[ ref_idx_11 [ x0 ][ y0 ] ] = = 0 &&
          chroma_weight_10_flag[ ref_idx_10 [ x0 ][ y0 ] ] = = 0 &&
          chroma_weight_11_flag[ ref_idx_11 [ x0 ][ y0 ] ] = = 0 &&
          cbWidth * cbHeight >= 256 )
        bcw_idx[ x0 ][ y0 ]                                         ae(v)
    }
  }
  if( !pcm_flag[ x0 ][ y0 ] ) {
    if( CuPredMode[ x0 ][ y0 ] != MODE_INTRA &&
      general_merge_flag[ x0 ][ y0 ] = = 0 )
      cu_cbf                                                        ae(v)
    if( cu_cbf ) {
      if( CuPredMode[ x0 ][ y0 ] = = MODE_INTER &&
sps_sbt_enabled_flag &&
        !ciip_flag[ x0 ][ y0 ] && !MergeTriangleFlag[ x0 ][ y0 ] ) {
        if( cbWidth <= MaxSbtSize && cbHeight <= MaxSbtSize ) {
          allowSbtVerH = cbWidth >= 8
          allowSbtVerQ = cbWidth >= 16
          allowSbtHorH = cbHeight >= 8
          allowSbtHorQ = cbHeight >= 16
          if( allowSbtVerH || allowSbtHorH || allowSbtVerQ ||
allowSbtHorQ )
            cu_sbt_flag                                             ae(v)
        }
        if( cu_sbt_flag ) {
          if( ( allowSbtVerH || allowSbtHorH ) && ( allowSbtVerQ
|| allowSbtHorQ) )
            cu_sbt_quad_flag                                        ae(v)
          if( ( cu_sbt_quad_flag && allowSbtVerQ && allowSbtHorQ
) ||
              ( !cu_sbt_quad_flag && allowSbtVerH && allowSbtHorH
) )
            cu_sbt_horizontal_flag                                  ae(v)
          cu_sbt_pos_flag                                           ae(v)
        }
      }
      numSigCoeff = 0
      numZeroOutSigCoeff = 0
      transform_tree( x0, y0, cbWidth, cbHeight, treeType )
      lfnstWidth = ( treeType = =
DUAL_TREE_CHROMA ) ? cbWidth / SubWidthC
                  : cbWidth
      lfnstHeight = ( treeType = =
DUAL_TREE_CHROMA ) ? cbHeight / SubHeightC
                  : cbHeight
      if( Min( lfnstWidth, lfnstHeight ) >= 4 &&
```

TABLE 2-continued

| | Descriptor |
|---|---|
| sps_lfnst_enabled_flag = = 1 && | |
| CuPredMode[ x0 ][ y0 ] = = MODE_INTRA && | |
| IntraSubPartitionsSplitType = = ISP_NO_SPLIT && | |
| !intra_mip_flag[ x0 ][ y0 ] ) { | |
| if( ( numSigCoeff > ( ( treeType = = SINGLE_TREE) ? 2 : 1 ) ) & & | |
| numZeroOutSigCoeff = = 0 ) | |
| lfnst_idx[ x0 ][ y0 ] | ae(v) |
| } | |
| } | |
| } | |
| } | |

Here, cu_skip_flag may indicate whether a skip mode is applied to a current block (CU).

pred_mode_flag equal to 0 specifies that the current coding unit is coded in inter prediction mode. pred_mode_flag equal to 1 specifies that the current coding unit is coded in intra prediction mode.

pred_mode_ibc_flag equal to 1 specifies that the current coding unit is coded in IBC prediction mode. pred_mode_ibc_flag equal to 0 specifies that the current coding unit is not coded in IBC prediction mode.

pcm_flag[x0][y0] equal to 1 specifies that the pcm_sample( ) syntax structure is present and the transform_tree( ) syntax structure is not present in the coding unit containing the luma coding block at position (x0, y0). pcm_flag[x0][y0] equal to 0 specifies that the pcm_sample ( ) syntax structure is not present. That is, pcm_flag may specify whether puls coding modulation (PCM) mode is applied to the current block. When the PCM mode is applied to the current block, prediction/transform/quantization, etc. are not applied, and the value of the original sample within the current block may be coded and signaled.

intra_mip_flag[x0][y0] equal to 1 specifies that the intra prediction type for luma samples is matrix-based intra prediction (MIP). intra_mip_flag[x0][y0] equal to 0 specifies that the intra prediction type for luma samples is not MIP. That is, intra_mip_flag may specify whether the MIP prediction mode (type) is applied to (the luma sample of) the current block.

intra_chroma_pred_mode[x0][y0] specifies the intra prediction mode for chroma samples in the current block.

general_merge_flag[x0][y0] specifies whether the inter prediction parameters for the current coding unit are inferred (derived) from a neighbouring inter-predicted partition. That is, general_merge_flag may indicate that the general merge is available, and when the value of general_merge_flag is 1, regular merge mode, mmvd mode, and merge subblock mode (subblock merge mode) may be available. For example, when the value of general_merge_flag is 1, the merge data syntax may be parsed from the encoded video/image information (or bit stream) and the merge data syntax may be configured/coded to include the following information.

TABLE 3

| | Descriptor |
|---|---|
| merge_data( x0, y0, cbWidth, cbHeight ) { | |
| if ( CuPredMode[ x0 ][ y0 ] = = MODE_IBC ) { | |
| if( MaxNumMergeCand > 1 ) | |
| merge_idx[ x0 ][ y0 ] | ae(v) |
| } else { | |
| if( sps_mmvd_enabled_flag \|\| cbWidth * cbHeight != 32 ) | |
| regular_merge_flag[ x0 ][ y0 ] | ae(v) |
| if ( regular_merge_flag[ x0 ][ y0 ] = = 1 ){ | |
| if( MaxNumMergeCand > 1 ) | |
| merge_idx[ x0 ][ y0 ] | ae(v) |
| } else { | |
| if( sps_mmvd_enabled_flag && cbWidth * cbHeight != 32 ) | |
| mmvd_merge_flag[ x0 ][ y0 ] | ae(v) |
| if( mmvd_merge_flag[ x0 ][ y0 ] = = 1 ) { | |
| if( MaxNumMergeCand > 1 ) | |
| mmvd_cand_flag[ x0 ][ y0 ] | ae(v) |
| mmvd_distance_idx[ x0 ][ y0 ] | ae(v) |
| mmvd_direction_idx[ x0 ][ y0 ] | ae(v) |
| } else { | |
| if( MaxNumSubblockMergeCand > 0 && cbWidth >= 8 && cbHeight >=8 ) | |
| merge_subblock_flag[ x0 ][ y0 ] | ae(v) |
| if( merge_subblock_flag[ x0 ][ y0 ] = = 1 ) { | |
| if( MaxNumSubblockMergeCand > 1 ) | |
| merge_subblock_idx[ x0 ][ y0 ] | ae(v) |
| } else { | |
| if( sps_ciip_enabled_flag && cu_skip_flag[ x0 ][ y0 ] = = | |

TABLE 3-continued

| | Descriptor |
|---|---|
| 0 && | |
| ( cbWidth * cbHeight ) >= 64 && cbWidth < 128 && | |
| cbHeight < 128 ) { | |
| ciip_flag[ x0 ][ y0 ] | ae(v) |
| if( ciip_flag[ x0 ][ y0 ] && MaxNumMergeCand > 1 ) | |
| merge_idx[ x0 ][ y0 ] | ae(v) |
| } | |
| if( MergeTriangleFlag[ x0 ][ y0 ] ) { | |
| merge_triangle_split_dir[ x0 ][ y0 ] | ae(v) |
| merge_triangle_idx0[ x0 ][ y0 ] | ae(v) |
| merge_triangle_idx1[ x0 ][ y0 ] | ae(v) |
| } | |
| } | |
| } | |
| } | |
| } | |
| } | |

Here, regular_merge_flag[x0][y0] equal to 1 specifies that regular merge mode is used to generate the inter prediction parameters of the current coding unit. That is, regular_merge_flag indicates whether the merge mode (normal merge mode) is applied to the current block.

mmvd_merge_flag[x0][y0] equal to 1 specifies that merge mode with motion vector difference (MMVD) is used to generate the inter prediction parameters of the current coding unit. That is, mmvd_merge_flag indicates whether MMVD is applied to the current block.

mmvd_cand_flag[x0][y0] specifies whether the first (0) or the second (1) candidate in the merging candidate list is used with the motion vector difference derived from mmvd_distance_idx[x0][y0] and mmvd_direction_idx[x0][y0].

mmvd_distance_idx[x0][y0] specifies the index used to derive MmvdDistance[x0][y0].

mmvd_direction_idx[x0][y0] specifies index used to derive MmvdSign[x0][y0].

merge_subblock_flag[x0][y0] specifies whether merge mode is used to generate subblock-based inter prediction parameters for the current coding unit. That is, merge_subblock_flag may specify whether the subblock merge mode (or affine merge mode) is applied to the current block.

merge_subblock_idx[x0][y0] specifies the merge candidate list of the subblock-based merge candidate list.

ciip_flag[x0][y0] specifies whether the combined inter-picture merge and intra-picture prediction is applied for the current coding unit.

ciip_flag[x0][y0] specifies whether the combined inter-picture merge and intra-picture prediction is applied for the current coding unit.

merge_triangle_idx0[x0][y0] specifies the first merge candidate index of the triangle shape-based motion compensation candidate list.

merge_triangle_idx1[x0][y0] specifies the second merge candidate index of the triangle shape-based motion compensation candidate list.

merge_idx[x0][y0] specifies the merge candidate index of the merge candidate list.

Meanwhile, referring back to the CU syntax, mvp_10_flag[x0][y0] specifies the motion vector predictor index of list 0. That is, when the MVP mode is applied, mvp_10_flag may indicate a candidate selected for driving the MVP of the current block in the MVP candidate list 0.

mvp_11_flag[x0][y0] has the same semantics as mvp_10_flag, with 10 and list 0 replaced by 11 and list 1, respectively.

inter_pred_idc[x0][y0] specifies whether list0, list1, or bi-prediction is used for the current coding unit.

sym_mvd_flag[x0][y0] equal to 1 specifies that the syntax elements ref_idx_10[x0][y0] and ref_idx_11[x0][y0], and the mvd_coding(x0, y0, refList, cpIdx) syntax structure for refList equal to 1 are not present. That is, sym_mvd_flag indicates whether symmetric MVD is used in mvd coding.

ref_idx_10[x0][y0] specifies the list 0 reference picture index for the current coding unit.

ref_idx_11[x0] [y0] has the same semantics as ref_idx_10, with 10, L0 and list 0 replaced by 11, L1 and list 1, respectively.

inter_affine_flag[x0][y0] equal to 1 specifies that for the current coding unit, when decoding a P or B slice, affine model based motion compensation is used to generate the prediction samples of the current coding unit.

cu_affine_type_flag[x0][y0] equal to 1 specifies that for the current coding unit, when decoding a P or B slice, 6-parameter affine model based motion compensation is used to generate the prediction samples of the current coding unit. cu_affine_type_flag[x0][y0] equal to 0 specifies that 4-parameter affine model based motion compensation is used to generate the prediction samples of the current coding unit.

amvr_flag[x0][y0] specifies the resolution of motion vector difference. The array indices x0, y0 specify the location (x0, y0) of the top-left luma sample of the considered coding block relative to the top-left luma sample of the picture. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_precision_idx[x0][y0].

amvr_precision_flag[x0][y0] equal to 0 specifies that when inter_affine_flag[x0][y0] is 0, the resolution of the motion vector difference is one integer luma sample and, otherwise, the resolution of the motion vector difference is 1/16 of a luma sample. amvr_precision_flag[x0][y0] equal to 1 specifies that when inter_affine_flag[x0][y0] is 0, the resolution of the motion vector difference is four luma samples and, otherwise, the resolution of the motion vector difference is one integer luma sample. The array indices x0 and y0 specify the location (x0, y0) of the top-left luma sample of the considered coding block relative to the top-left luma sample of the picture.

bcw_idx[x0][y0] specifies the weight index of bi-prediction with CU weights.

Derivation of Motion Information

Inter prediction may be performed using motion information of the current block. The encoding apparatus may derive optimal motion information for the current block through a motion estimation procedure. For example, the encoding apparatus may search for a similar reference block having a high correlation in units of fractional pixels within a predetermined search range in the reference picture using the original block in the original picture for the current block, thereby deriving motion information. Similarity of blocks may be derived based on a difference of phase based sample values. For example, the similarity of the blocks may be calculated based on the SAD between the current block (or template of the current block) and the reference block (or template of the reference block). In this case, motion information may be derived based on a reference block having the smallest SAD in the search area. The derived motion information may be signaled to the decoding apparatus according to various methods based on the inter prediction mode.

Generation of Prediction Sample

A predicted block for the current block may be derived based on motion information derived according to the prediction mode. The predicted block may include prediction samples (prediction sample array) of the current block. When the motion vector of the current block indicates a fractional sample unit, an interpolation procedure may be performed, through which prediction samples of the current block may be derived based on reference samples in the fractional sample unit within a reference picture. When affine inter prediction is applied to the current block, prediction samples may be generated based on a sample/subblock unit MV. When bi-prediction is applied, prediction samples derived through weighting or weighted averaging (according to phase) of prediction samples derived based on L0 prediction (that is, prediction using reference picture and MVL0 in reference picture list L0) and prediction samples derived based on L1 prediction (that is, prediction using reference picture and MVL1 in reference picture list L1) may be used as prediction samples of the current block. When bi-prediction is applied, if the reference picture used for L0 prediction and the reference picture used for L1 prediction are located in different temporal directions with respect to the current picture (i.e., bi-prediction and bidirectional prediction), it may be called true bi-prediction.

As described above, reconstructed samples and reconstructed pictures may be generated based on the derived prediction samples, and thereafter, a procedure such as in-loop filtering may be performed.

As described above, inter prediction may be performed based on a reference picture, and the resolution of each picture may vary in units such as group of pictures (GOP). That is, a case may occur where the resolutions of the current picture and the reference picture are different.

Meanwhile, even if the resolutions of the two pictures are different, if the reference picture and the current picture belong to the same CLVS (coded layer video sequence), etc., prediction of the current picture may be performed through reference picture resampling (RPR) technology, which performs additional processing for different resolutions. According to the reference picture resampling technology, the resolution of the reference picture may be modified.

That is, the resolution may be adjusted in the picture within one layer. If the resolutions of the current picture and the reference picture are different, the resolution ratio between the reference picture and the current picture is calculated, and the reference picture may be referenced by modifying the resolution to the same size as the current picture through sampling. Meanwhile, resolution may be determined based on periodic time (0.5 seconds, 1 second, etc.), predetermined number of frames (8, 16, 32, 64, 128, etc.), multiples of GOP (group of picture), multiples of RAP (random access point), etc. When the resolution is determined in this way, since the resolution is mechanically determined without considering the characteristics of each picture, there is a problem that the optimal resolution cannot be determined.

To improve this, the present disclosure proposes a configuration that modifies the resolution by adaptively selecting a plurality of resolution ratios. According to the present disclosure, encoding and decoding efficiency can be greatly improved by determining the resolution ratio between the current picture and the reference picture, that is, determining the optimal resolution, and performing reference sample resampling by determining the resolution ratio between the reference picture and the current picture.

In addition, according to the present disclosure, as the encoder and decoder technology related to the adaptive resolution modification technology, when the resolutions of the reference picture and the current picture are different, a method for transmitting related information and a control method for the encoder and decoder technology are provided. Therefore, it is possible to provide a solution to the above-described problem.

Additionally, according to an embodiment of the present disclosure, the resolution may be determined by considering the quantization parameter and/or the complexity of the picture (e.g., PSNR, bit rate, etc.), and at this time, one resolution may be selected from among various resolutions.

More specifically, according to an embodiment of the present disclosure, for adaptive resolution modification technology and/or reference picture resampling (RPR) technology, the optimal resolution, that is, the optimal resolution ratio, may be determined by considering the quantization parameter and/or the complexity of the picture.

Meanwhile, before determining the optimal resolution ratio and applying the resolution modification technology and/or the reference picture resampling technology, it may be determined whether the resolution modification technology is applied to the current picture, whether reference picture resampling is performed, etc. In an image encoding apparatus, this may be encoded as specific information and included in a bitstream, but it may also be implicitly derived from other information.

In the following, an embodiment of determining an optimal resolution ratio according to the present disclosure will be described.

As an example, an image encoding and/or decoding apparatus may select one of a plurality of resolution ratios. For each group of pictures (GOP), the image encoding apparatus may select one of a plurality of candidate resolutions based on a Peak Signal to Noise Ratio (PSNR) threshold that varies depending on an initial quantization parameter. To determine the resolution, a PSNR between an image acquired by down-sampling (down-scaling) or up-sampling (up-scaling) (e.g., an image obtained by downsampling or upsampling a first picture of each GOP) and an original image (e.g., a source image, a first picture of each GOP) may be derived for the first picture of each GOP. The PSNR of the current picture may be derived based on the PSNR of the first picture in the same GOP. Meanwhile, the resolution ratio may be determined in units of GOP, and a GOP may include one or more images (pictures). That is, the PSNR may be calculated between the original image and the upsampled or downsampled image. Here, the first picture may be downsampled (downscaled) to a resolution (half resolution) corresponding to half the original resolution and then resampled back to the original resolution.

As an example, when using adaptive resolution modification technology or reference picture resampling technology, one of various candidate resolutions may be selected for one picture. For example, candidate resolutions may include ½, ⅔, or 1. Here, 1 may mean the original resolution, and may be upsampled or downsampled to each resolution. Meanwhile, the candidate resolution may be expressed as 2, 3/2, or 1. That is, the reference picture may have a resolution that is smaller or larger than the current picture by 2, may have a resolution that is smaller or larger than the current picture by 3/2, or may have the same resolution as the current picture. If they have the same resolution, resolution ratio adjustment may not be performed.

Meanwhile, the resolution ratio value may be derived from index information indicating the resolution ratio, and the index information may be included in the bitstream as VPS, SPS, PPS, picture header, slice header, etc. Additionally, index information may be flag information. One of a plurality of resolution ratios may be selected using the corresponding index information. As another example, it is also possible to derive information about the resolution ratio based on other information.

As an example, one resolution among multiple resolutions may be selected according to a PSNR threshold that adaptively varies based on a quantization parameter. As an example, when reference picture resampling (RPR) is performed on an image included in any i-th GOP, the resolution ratio (scaling factor) (RPR_R) may be derived as follows.

$$\text{RPR\_R}[GOP_i] = \begin{cases} \frac{1}{2}, & ScaledPSNR_i > BasePSNR - (QP_i - BaseQP) * \text{Decay} \\ \frac{2}{3}, & ScaledPSNR_i > (BasePSNR - OffsetPSNR) - (QP_i - BaseQP) * \text{Decay} \\ 1, & \text{Oherwise} \end{cases} \quad \text{[Equation 1]}$$

As an example, the resolution ratio may be selected based on the scaled PSNR value (ScaledPSNR). A variable $\text{ScaledPSNR}_i$ value may mean the above-mentioned upsampled PSNR for the first picture in any i-th GOP. Additionally, variables BasePSNR and BaseQP may respectively represent a specific PSNR and a quantization parameter (QP), and each value may be predefined. The variable OffsetPSNR may represent a PSNR gap between images with two different resolutions. For example, the variable OffsetPSNR may represent a PSNR gap between images with ½ and ⅔ resolutions or 2 and 3/2 resolutions compared to the original image. A variable Decay may refer to the reduction rate of the threshold PSNR value according to the quantization parameter, and may be maintained as a constant value or changed. Meanwhile, $\text{QP}_i$ may refer to the initial quantization parameter of the first picture in any i-th GOP. In determining the resolution ratio with the reference picture, quantization parameter values and/or PSNR values may be used. Additionally, the quantization parameter value may be an initial quantization parameter value, and the quantization parameter value may be compared with a specific quantization parameter value. That is, the resolution ratio may be determined based on an operation (e.g., subtraction, etc.) that compares the quantization parameter value with the specific quantization parameter value. Additionally, the PSNR value may be compared to a specific PSNR value. That is, the resolution ratio may be determined based on an operation (e.g., subtraction, etc.) that compares the PSNR value with the specific PSNR value. That is, the resolution ratio between the reference picture and the current picture may be determined in units of Group of Pictures (GOP), so the same resolution ratio may be shared between pictures included in the same GOP.

According to [Equation 1] above, in one embodiment, the QP range is set to 27 to 47, and the pictures for both half (½) (ScalingRatioHor=2.0 and ScalingRatioVer=2.0) and ⅔ (ScalingRatioHor=1.5 and ScalingRatioVer=1.5) resolutions are respectively adjusted to the original resolution (UpscaledOutput=2), and BaseQP, OffsetPSNR, and Decay may be set to 37, 3, and 0.5. Here, BasePSNR for RA and AI may be set to 45 and 41, respectively. Here, when an image is encoded with half (½) or ⅔ resolution of the original image, the QP value may be adjusted based on an offset. Meanwhile, the QP value may be adjusted based on an offset defined as −6 for an image with a ½ resolution ratio and −4 for an image with a ⅔ resolution ratio. The performance test according to this may be derived as follows. [Table 4] may show the performance of the proposed embodiment in RA.

TABLE 4

| | Y | U | V | EncT | DecT |
|---|---|---|---|---|---|
| Class A1 | −7.22% | 3.40% | 3.85% | 76% | 43% |
| Class A2 | −4.17% | 19.43% | 16.12% | 79% | 57% |
| Class B | −0.43% | 3.75% | 3.11% | 95% | 84% |
| Class C | 0.00% | 0.00% | 0.00% | 100% | 101% |
| Class E | | | | | |
| Overall | −2.42% | 5.82% | 5.03% | 89% | 71% |
| Class D | 0.00% | 0.00% | 0.00% | 100% | 100% |
| Class F | 0.00% | 0.00% | 0.00% | 101% | 102% |

In Table 4, the encoding time (EncT) and decoding time (DecT) may be ignored. Additionally, since the coding gain was obtained in Class A1 and Class A2, the LD test may be omitted.

Meanwhile, Equation 1 above for deriving the resolution ratio (scaling factor) (RPR_SF) may be modified as follows.

$$\text{RPR\_SF}[GOP_i] = \begin{cases} 2.0, & DnUpPSNR_i > (BasePSNR) - (QP_i - BaseQP) * 0.5 \\ 1.5, & DnUpPSNR_i > (BasePSNR - OffsetPSNR) - (QP_i - BaseQP) * 0.5 \\ 1.0, & \text{Oherwise} \end{cases} \quad \text{[Equation 2]}$$

As an example, a variable DnUpPSNR may represent the down-sampled or up-sampled PSNR for the first picture in any i-th GOP, as mentioned above. Other variables, BasePSNR, BaseQP, OffsetPSNR, etc. may have the same meaning as described in Equation 1 above. $\text{QP}_i$ may also mean the initial quantization parameter of the first picture in any i-th GOP. Meanwhile, unlike [Equation 1], a threshold value multiplied by the quantization parameter value (or the comparison value between the quantization parameter and the initial quantization parameter value) may be specified as a specific value. That is, it may be a variable (e.g., Decay) value as in [Equation 1], but may be a specific value (e.g., 0.5) in [Equation 2].

As an embodiment according to [Equation 2], the QP range is set to 22 to 42, and the pictures for half (½) (ScalingRatioHor=2.0 and ScalingRatioVer=2.0) and ⅔ (ScalingRatioHor=1.5 and ScalingRatioVer=1.5) resolutions are respectively adjusted to the original resolution (UpscaledOutput=2), and BaseQP and OffsetPSNR may be set to 37 and 3. Here, BasePSNR for RA and AI may be set to 45 and 42, respectively. Here, when an image is encoded with half (½) or ⅔ resolution of the original image, the QP value may be adjusted based on an offset. Meanwhile, the QP value may be adjusted based on an offset defined as −6 for an image with a ½ resolution ratio and −4 for an image with a ⅔ resolution ratio. The performance test according to this may be derived as follows. [Table 5] may show the performance of the proposed embodiment in AI, and [Table 6] may show the performance of the proposed embodiment in RA.

TABLE 5

| | Y | U | V | EncT | DecT |
|---|---|---|---|---|---|
| Class A1 | −1.55% | 2.38% | 2.60% | 108% | 65% |
| Class A2 | −2.81% | 12.66% | 9.69% | 94% | 74% |
| Class B | 0.52% | 2.13% | 2.27% | 96% | 87% |
| Class C | 0.00% | 0.00% | 0.00% | 98% | 95% |
| Class E | 0.09% | 0.25% | 0.27% | 96% | 94% |
| Overall | −0.57% | 3.14% | 2.73% | 98% | 83% |
| Class D | 0.02% | 0.06% | 0.05% | 97% | 99% |
| Class F | 0.00% | 0.00% | 0.00% | 95% | 98% |

TABLE 6

| | Y | U | V | EncT | DecT |
|---|---|---|---|---|---|
| Class A1 | −3.48% | 2.23% | 3.71% | 78% | 54% |
| Class A2 | −1.55% | 7.82% | 6.70% | 86% | 73% |
| Class B | 0.08% | 1.83% | 1.27% | 97% | 89% |
| Class C | 0.00% | 0.00% | 0.00% | 100% | 99% |
| Class E | | | | | |
| Overall | −0.98% | 2.62% | 2.50% | 92% | 80% |
| Class D | 0.00% | 0.00% | 0.00% | 100% | 101% |
| Class F | 0.00% | 0.00% | 0.00% | 101% | 100% |

Additionally, the performance calculated for the embodiment where the QP range is 27 to 47 may be as shown in the following [Table 7] to [Table 8]. Likewise, [Table 7] may show the performance of the proposed embodiment in AI, and [Table 8] may show the performance of the proposed embodiment in RA.

TABLE 7

| | Y | U | V | EncT | DecT |
|---|---|---|---|---|---|
| Class A1 | −4.87% | 5.83% | 4.06% | 114% | 51% |
| Class A2 | −5.66% | 25.61% | 18.95% | 101% | 60% |
| Class B | 0.00% | 3.39% | 3.66% | 102% | 78% |
| Class C | 0.00% | −0.05% | −0.03% | 98% | 93% |
| Class E | 0.50% | 0.05% | 0.18% | 98% | 80% |
| Overall | −1.67% | 6.18% | 4.87% | 102% | 73% |
| Class D | 0.02% | 0.07% | 0.05% | 97% | 95% |
| Class F | 0.01% | −0.01% | 0.01% | 96% | 95% |

TABLE 8

| | Y | U | V | EncT | DecT |
|---|---|---|---|---|---|
| Class A1 | −7.22% | 3.40% | 3.85% | 76% | 43% |
| Class A2 | −4.17% | 19.43% | 16.12% | 79% | 57% |
| Class B | −0.43% | 3.75% | 3.11% | 95% | 82% |
| Class C | 0.00% | 0.00% | 0.00% | 100% | 100% |
| Class E | | | | | |
| Overall | −2.42% | 5.82% | 5.03% | 89% | 71% |
| Class D | 0.00% | 0.00% | 0.00% | 100% | 101% |
| Class F | 0.00% | 0.00% | 0.00% | 102% | 99% |

According to the above-described embodiment of the present disclosure, one resolution ratio may be selected from one or more resolution ratio candidates, and thus the encoding/decoding coding efficiency can be significantly increased.

Hereinafter, an embodiment of the present disclosure that adaptively modifies a resolution will be described in more detail with reference to the drawings.

Figure 9:
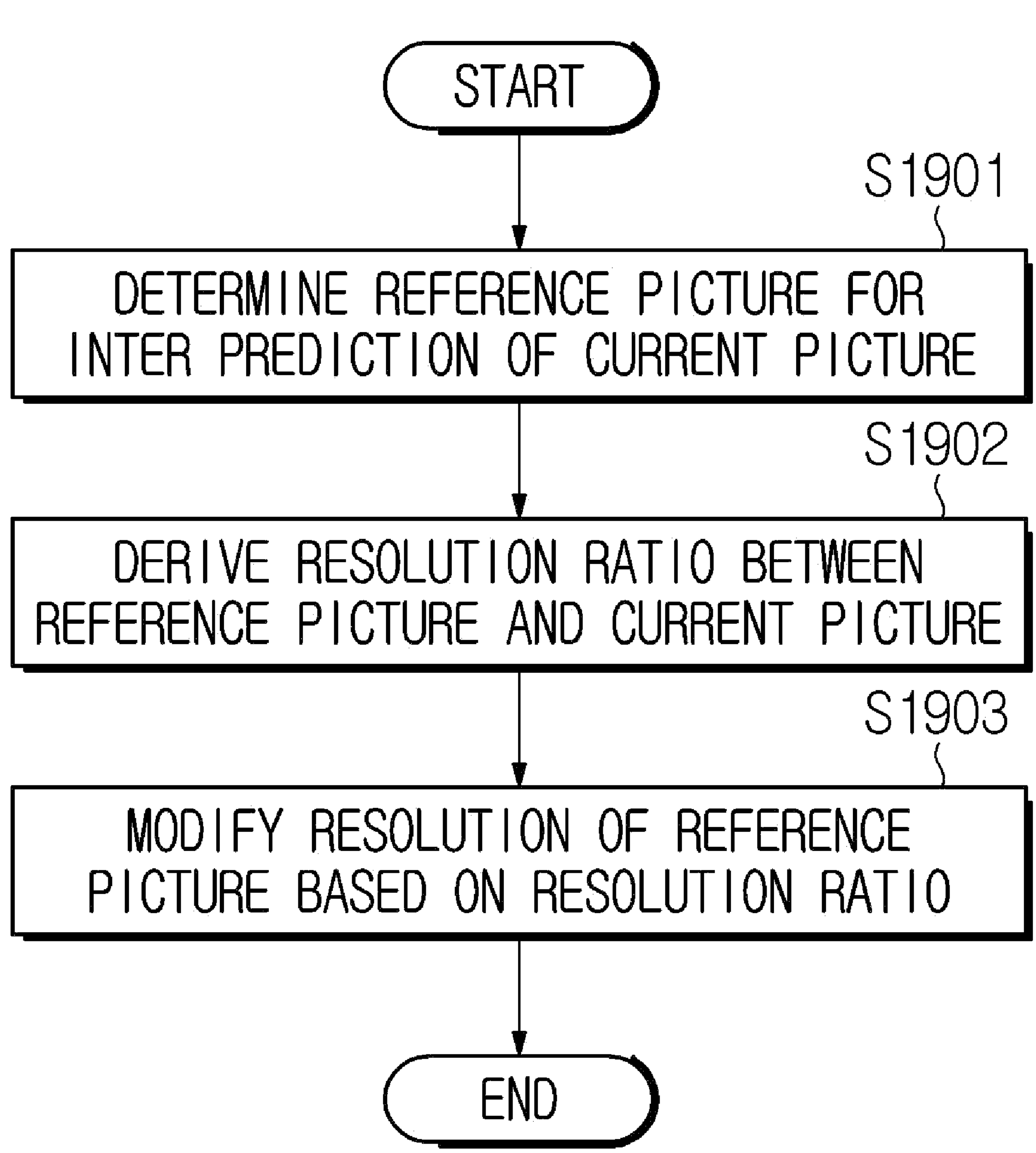
FIGS. 9 to 10 are diagrams illustrating an image encoding or decoding method according to an embodiment of the present disclosure.

FIG. 9 is a diagram illustrating an image encoding method according to an embodiment of the present disclosure.

As an example, the image encoding method of FIG. 9 may be performed by an image encoding apparatus. An example of an image encoding apparatus is the same as described with reference to other drawings.

First, the image encoding method performed by the image encoding apparatus may determine a reference picture for inter prediction of a current picture (S1901). As an example, the resolutions of the current picture and the reference picture may be different from each other and may belong to different GOPs. That is, the resolution may be applied in units of group of pictures (GOP). The process of determining whether to perform inter prediction of the current picture or the reference picture for inter prediction of the current picture may be derived as described above with reference to other drawings.

Additionally, the resolution ratio between the derived reference picture and the current picture may be derived (S1902). As an example, step S1902 may be performed after it is determined that the resolution ratios of the reference picture and the current picture are different. Here, the resolution ratio may be derived to be one of a plurality of resolution ratios, and the plurality of resolution ratios may be predefined. For example, the plurality of resolution ratios may include at least one of 2, 3/2, or 1, and may be expressed as ½, ⅔, or 1. When one resolution ratio is selected from a plurality of resolution ratios, the quantization parameter or PSNR described above may be used. The resolution ratio may be determined based on the initial quantization parameter of the first picture in the same GOP as the current picture. Additionally, the initial quantization parameter may be compared with a specific quantization parameter value. Meanwhile, the resolution ratio may be determined based further on the PSNR for the first picture within the GOP. Here, when calculating the PSNR, the first picture may be downscaled (downsampled) or upscaled (upsampled) to a specific resolution. The PSNR for the first picture may be compared with a specific PSNR value.

The resolution of the reference picture may be modified (S1903) based on the resolution ratio. As an example, resolution index information indicating the resolution ratio may be encoded into a bitstream. The reference picture whose resolution has been modified may be used as a reference picture for inter prediction of the current picture.

Meanwhile, since FIG. 9 corresponds to an embodiment of the present disclosure, some steps may be modified, deleted, or added. For example, a step of determining whether reference picture resampling is applied to the current picture or a step of encoding index information indicating the resolution ratio into a bitstream may be further included. In this case, reference picture resampling may be determined based on whether a coding tool (e.g., BDOF, DMVR, PROF or TMVP) is applied. Additionally, the order of some steps may be changed.

Figure 10:
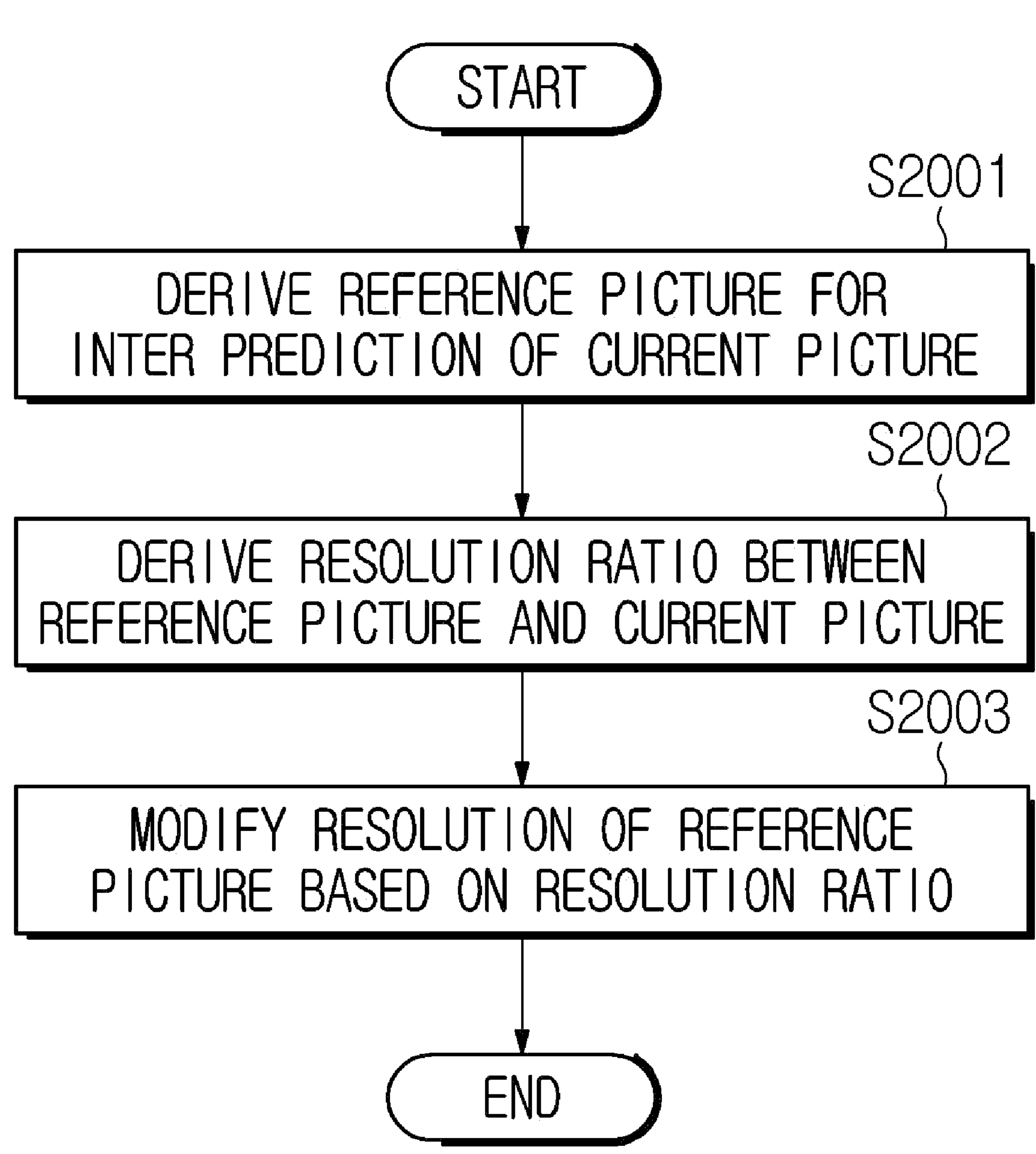

FIG. 10 is a diagram illustrating an image decoding method according to an embodiment of the present disclosure.

As an example, the image decoding method of FIG. 10 may be performed by an image decoding apparatus. An example of the image decoding apparatus is the same as described with reference to other drawings.

Additionally, each step (S1901, S1902, S1903) of the image encoding method described in FIG. 9 may correspond to each step (S2001, S2002, S2003) in FIG. 10. In other words, as long as it does not conflict with the decoding method, it also corresponds to each step in FIG. 10, and the contents of the corresponding description may be applied.

First, the image decoding method performed by the image decoding apparatus may derive a reference picture for inter prediction of the current picture (S2001). As described above, whether inter prediction of the current picture and the reference picture may be determined by the encoding apparatus, and the resolutions of the current picture and the reference picture may be different. That is, the GOP to which the current picture belongs and the GOP to which the reference picture belongs may be different from each other.

Additionally, the resolution ratio between the derived reference picture and the current picture may be derived (S2002). Here, the resolution ratio may be derived to be one of a plurality of resolution ratios, and the plurality of resolution ratios may be predefined. For example, the plurality of resolution ratios may include at least one of 2, 3/2, or 1, and may be expressed as 1/2, 2/3, or 1. One resolution ratio among a plurality of resolution ratios may be selected by information (e.g., index information) indicating the resolution ratio decoded from the bitstream. Meanwhile, the selected resolution ratio may be derived using the quantization parameter or PSNR described above. This is the same as described above.

Thereafter, the resolution of the reference picture may be modified (S2003) based on the resolution ratio. As described above, when the resolution of the reference picture is modified, inter prediction according to reference picture resampling may be performed. That is, the reference picture whose resolution has been modified may be used as a reference picture for inter prediction of the current picture.

Meanwhile, since FIG. 10 corresponds to an embodiment of the present disclosure, some steps may be modified, deleted, or added. For example, a step of determining whether reference picture resampling is applied to the current picture or a step of decoding index information indicating the resolution ratio from a bitstream may be further included. In this case, whether reference picture resampling is applied may be determined by decoding related information from the bitstream, or may be implicitly derived and determined from other information. In addition, reference picture resampling may be performed based on whether a coding tool (e.g., BDOF, DMVR, PROF or TMVP) is applied. Additionally, the order of some steps may be changed.

Figure 11:
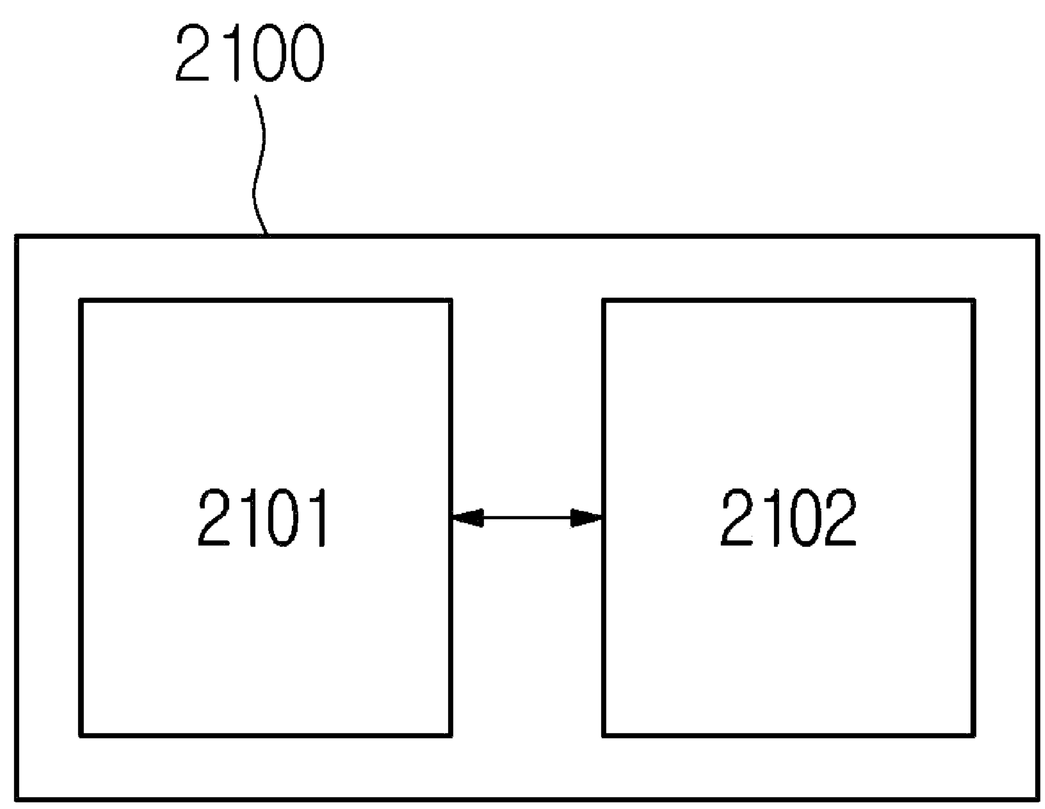
FIG. 11 is a diagram for explaining an image encoding or decoding apparatus according to an embodiment of the present disclosure.

FIG. 11 is a diagram illustrating an image encoding or decoding apparatus according to an embodiment of the present disclosure.

As an example, the image encoding or decoding apparatus 2100 may include a memory 2101 and one or more processors 2102, and the image encoding or decoding apparatus may perform the image encoding method or decoding method described above, respectively.

In addition, although not shown in the drawing, it may further include a user interface, I/O tools, a display, etc.

As an example, one or more processors perform the above-described embodiment and image encoding/decoding method, but some steps may be performed in parallel, or, if possible, the order of some steps may be changed or some steps may be omitted.

According to the present disclosure described above, since the optimal resolution ratio is determined more adaptively, more detailed and efficient reference picture resampling may be performed.

Various embodiments according to the present disclosure may be used alone or in combination with other embodiments.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, if it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 12:
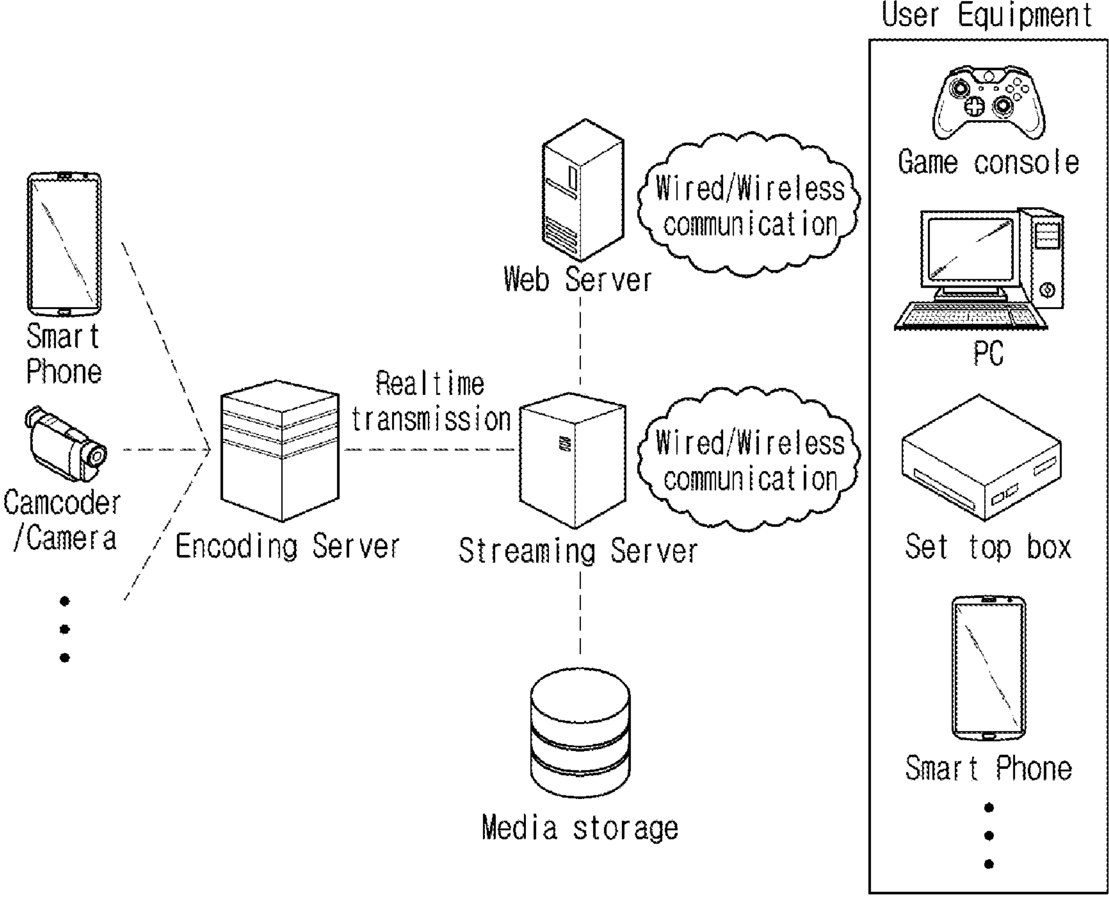
FIG. 12 is a view showing a content streaming system to which an embodiment of the present disclosure is applicable.

FIG. 12 is a view showing a content streaming system, to which an embodiment of the present disclosure is applicable.

As shown in FIG. 12, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

INDUSTRIAL APPLICABILITY

The embodiments of the present disclosure may be used to encode or decode an image.

The invention claimed is:

1. An image encoding method performed by an image encoding apparatus, the image encoding method comprising:

determining a reference picture for inter prediction of a current picture;

deriving a resolution ratio between the reference picture and the current picture; and modifying a resolution of the reference picture based on the resolution ratio, wherein resolution index information indicating the resolution ratio is encoded into a bitstream, wherein the resolution ratio is determined based on comparing a threshold that is derived based on an initial quantization parameter of a first picture in group of pictures (GOP) with a down-sampled peak signal to noise ratio (PSNR) for the first picture.

2. The image encoding method of claim 1, wherein the resolution index information indicates one of a plurality of resolution ratios.

3. The image encoding method of claim 1, wherein the resolution ratio comprises a first resolution ratio of 2 and a second resolution ratio of 3/2.

4. The image encoding method of claim 1, wherein the resolution is applied in units of GOP.

5. The image encoding method of claim 4, wherein the resolution ratio is derived by downscaling the first picture to a specific resolution.

6. The image encoding method of claim 4, wherein the PSNR for the first picture is compared with a specific PSNR value.

7. The image encoding method of claim 1, further comprising determining whether reference picture resampling is performed on the current picture.

8. The image encoding method of claim 7, wherein the reference picture resampling is performed based on whether to apply BDOF, DMVR, PROF or TMVP.

9. A non-transitory computer-readable medium storing a bitstream generated by the image encoding method of claim 1.

10. An image decoding method performed by an image decoding apparatus, the image decoding method comprising:

deriving a reference picture for inter prediction of a current picture;

deriving a resolution ratio between the reference picture and the current picture; and modifying a resolution of the reference picture based on the resolution ratio, wherein the resolution ratio is derived based on resolution index information of a bitstream, wherein the resolution ratio is determined based on comparing a threshold that is derived based on an initial quantization parameter of a first picture in group of pictures (GOP) with a down-sampled peak signal to noise ratio (PSNR) for the first picture.

11. The image decoding method of claim 10, wherein the resolution ratio comprises a first resolution ratio of 2 and a second resolution ratio of 3/2.

12. A method of transmitting a bitstream generated by an image encoding method, the image encoding method comprising:

determining a reference picture for inter prediction of a current picture;

deriving a resolution ratio between the reference picture and the current picture; and modifying a resolution of the reference picture based on the resolution ratio, wherein resolution index information indicating the resolution ratio is encoded into a bitstream, wherein the resolution ratio is determined based on comparing a threshold that is derived based on an initial quantization parameter of a first picture in group of pictures (GOP) with a down-sampled peak signal to noise ratio (PSNR) for the first picture.

* * * * *